(12) United States Patent
Garg et al.

(10) Patent No.: US 11,019,116 B2
(45) Date of Patent: May 25, 2021

(54) CONFERENCE SYSTEM, CONFERENCE SERVER, AND PROGRAM BASED ON VOICE DATA OR ILLUMINATION LIGHT

(71) Applicant: Konica Minolta, Inc., Tokyo (JP)

(72) Inventors: Rachit Garg, Hino (JP); Kazuaki Kanai, Hino (JP); Toshiyuki Maeshima, Machida (JP)

(73) Assignee: Konica Minolta, Inc., Tokyo (JP)

( * ) Notice: Subject to any disclaimer, the term of this patent is extended or adjusted under 35 U.S.C. 154(b) by 83 days.

(21) Appl. No.: 16/448,811

(22) Filed: Jun. 21, 2019

(65) Prior Publication Data

US 2019/0394247 A1 Dec. 26, 2019

(30) Foreign Application Priority Data

Jun. 22, 2018 (JP) .............................. JP2018-118778

(51) Int. Cl.
*G06F 3/048* (2013.01)
*H04L 29/06* (2006.01)

(52) U.S. Cl.
CPC .................................. *H04L 65/403* (2013.01)

(58) Field of Classification Search
CPC ................ G06F 3/0481; H04L 65/403; H04L 29/06401; H04L 12/1822; H04L 12/1813; G06Q 10/101; H04N 7/15
See application file for complete search history.

(56) References Cited

U.S. PATENT DOCUMENTS

| 5,710,591 | A * | 1/1998 | Bruno | H04M 3/42221 |
| | | | | 348/14.06 |
| 7,099,448 | B1 * | 8/2006 | Laniepce | H04M 1/578 |
| | | | | 379/202.01 |
| 8,791,977 | B2 * | 7/2014 | Marvit | H04N 7/15 |
| | | | | 348/14.01 |
| 8,954,323 | B2 * | 2/2015 | Tsujikawa | G10L 21/0272 |
| | | | | 704/226 |
| 9,210,269 | B2 * | 12/2015 | Liu | H04M 3/563 |
| 9,495,663 | B2 | 11/2016 | Ramaswamy et al. | |
| 2004/0128354 | A1 * | 7/2004 | Horikiri | H04L 29/06027 |
| | | | | 709/204 |

(Continued)

FOREIGN PATENT DOCUMENTS

JP 2013-223019 A 10/2013

*Primary Examiner* — Haoshian Shih
(74) *Attorney, Agent, or Firm* — Osha Bergman Watanabe & Burton

(57) ABSTRACT

A conference system includes: a computer processing unit (CPU) that: acquires, for each of information processing devices used by participants of a conference, information specific to a first area in which the conference is held; extracts features from the information specific to the first area; compares the features of each of the information processing devices with one another; groups the information processing devices with similar features together; assigns, for each group of the information processing devices, a work space that can be accessed by the information processing devices of each group; and notifies the information processing devices of each group of information related to the work space that allows the information processing devices of each group to access the work space assigned to each group. The information processing devices access the work space using the information related to the work space.

20 Claims, 14 Drawing Sheets

(56) References Cited

U.S. PATENT DOCUMENTS

| | | | |
|---|---|---|---|
| 2007/0055490 A1* | 3/2007 | Aoki | G06Q 10/00 704/3 |
| 2010/0097226 A1* | 4/2010 | Parsons | G08B 13/19 340/573.1 |
| 2013/0091205 A1* | 4/2013 | Kotler | H04L 65/4015 709/204 |
| 2013/0216029 A1* | 8/2013 | Pawlewski | H04M 3/2281 379/88.01 |
| 2015/0206530 A1* | 7/2015 | Choi | G10L 15/22 704/249 |
| 2016/0086605 A1* | 3/2016 | Kim | H04M 3/56 348/14.03 |
| 2016/0285928 A1* | 9/2016 | Sanso | H04L 65/403 |
| 2016/0379673 A1* | 12/2016 | Chiyo | G10L 25/78 704/208 |
| 2017/0270930 A1* | 9/2017 | Ozmeral | G10L 17/005 |
| 2018/0005632 A1* | 1/2018 | Mann | H04R 1/32 |
| 2018/0032997 A1* | 2/2018 | Gordon | G06Q 20/3224 |
| 2018/0077542 A1* | 3/2018 | Xie | G06F 16/951 |
| 2018/0278605 A1* | 9/2018 | Fitterer | H04L 63/0861 |
| 2018/0315438 A1* | 11/2018 | Davies | G10L 21/0205 |
| 2018/0342250 A1* | 11/2018 | Cohen | G10L 21/0272 |
| 2019/0116210 A1* | 4/2019 | Keen | H04L 51/32 |
| 2019/0141097 A1* | 5/2019 | Shang | H04L 67/10 |
| 2019/0312917 A1* | 10/2019 | Choi | G06Q 10/103 |
| 2019/0325865 A1* | 10/2019 | Oktem | G10L 13/043 |

* cited by examiner

FIG. 4

| DEVICE NAME | EXTRACTED TEXT DATA WITH TIME STAMP | | |
|---|---|---|---|
| DEVICE A | something........ | Hello good evening everyone | ........something |
| DEVICE C | something........ | Bello good evening everyone | ........something |
| DEVICE E | something........ | Hello good evening one | ........something |

SOUNDLESS Tstart

SOUNDLESS Tend

*FIG. 6*

| DEVICE NAME | EXTRACTED TEXT DATA WITH TIME STAMP | | |
|---|---|---|---|
| DEVICE B | something..... | Hello let's start the meeting | .....something |
| DEVICE D | something..... | Hello let's start the meeting | .....something |
| DEVICE F | something..... | Bello let's start meeting | .....something |

SOUNDLESS Tstart

SOUNDLESS Tend

FIG. 8
|   | A | B | C | D | E | F |
|---|---|---|---|---|---|---|
| A | – | 0.1 | 0.85 | 0.15 | 0.9 | 0.15 |
| B | 0.1 | – | 0.1 | 1 | 0.08 | 0.91 |
| C | 0.85 | 0.1 | – | 0.1 | 0.87 | 0.12 |
| D | 0.15 | 1 | 0.1 | – | 0 | 0.91 |
| E | 0.9 | 0.08 | 0.87 | 0 | – | 0.1 |
| F | 0.15 | 0.91 | 0.12 | 0.91 | 0.1 | – |
 WORK SPACE X
 WORK SPACE Y

CONFERENCE SYSTEM, CONFERENCE SERVER, AND PROGRAM BASED ON VOICE DATA OR ILLUMINATION LIGHT

CROSS-REFERENCE TO RELATED APPLICATIONS

This application claims priority from Japanese Patent Application No. 2018-118778 filed on Jun. 22, 2018, the entire contents of which are incorporated herein by reference in its entirety.

TECHNICAL FIELD

The present invention relates to a conference system, a conference server, and a program.

BACKGROUND

In recent years, many software solutions for providing a work space related to a conference are appearing. The work space is, for example, a virtual space in which only participants of a conference can share materials so as to allow these participants to refer to the materials. The work space is assigned to participants of a conference on a conference basis. In the future, in order to share various kinds of information related to a conference, it is expected that software that is capable of providing a work space is increasingly used.

Participants of a conference, who use a work space, are required to access a shared work space that is created by an organizer of the conference on a conference basis. However, currently, even if participants of a conference gather in a conference room, each participant must input information for identifying each participant, such as a company ID or an e-mail address, and must search for a work space that can be accessed. Therefore, time and effort are required before the participants of the conference access the work space. Accordingly, a mechanism that is capable of automatically identifying a participant of a conference, and then automatically causing the participant to participate in a work space, is desired.

U.S. Pat. No. 9,495,663 discloses the technology in which participation in a conference is started by using proximity of a conference participant. According to this technology, when a host device or another device detects existence of a conference participant, an invitation letter for participating in a conference is transmitted to the conference participant.

JP 2013-223019 A discloses the technology in which when a transmission signal that requests a call from a terminal on the transmission side to a terminal on the receiving side is detected, a group identifier that identifies a group to which a plurality of terminals belongs, and a terminal identifier that identifies any of terminals belonging to the group, are extracted from the transmission signal, and a terminal that can be identified by the extracted group identifier and the extracted terminal identifier is called as a terminal on the receiving side.

In the technologies disclosed in U.S. Pat. No. 9,495,663 and JP 2013-223019 A, in order to cause a participant of a conference to automatically participate in a work space, it is necessary to carry out work of providing an external device such as a host device (a transceiver such as a Bluetooth (registered trademark) beacon, and a WiFi (registered trademark) router) in a conference room, and setting up the external device beforehand. Therefore, not only expenses for preparing a host device on a conference room basis, but also time and effort to carry out work of installing the host device in the conference room, are required.

In addition, if the technology in which by detecting an electrical wave transmitted from the host device used by a conference participant, the conference participant who is in a specific conference room is caused to access a work space, an electrical wave that is transmitted by a host device used by a third person who is in another conference room may be detected. For example, if a radio signal transmitted from a host device used by other persons who do not participate in the conference is picked up, there is a possibility that a work space will be assigned to the host device used by a third person too. In this case, if the third person who is not participating in the conference accesses the work space, there is a possibility that materials that should be shared among only the participants of the conference will leak out to the third person.

In addition, there is a case where some among participants of a conference participate in the conference from a place away from a conference room by using a video conferencing system. In this case, the participants who are at the place away from the conference room cannot be identified, and therefore a work space cannot be assigned to these participants. Consequently, conference materials cannot be shared.

SUMMARY

One or more embodiments of the present invention assign a work space only to limited participants of a conference.

According to one or more embodiments of the present invention, a conference system comprises: an information acquisition part that, for each of information processing devices used by participants of a conference, acquires information specific to an area in which the conference is held; a feature extraction part that extracts features from the specific information acquired for each of the information processing devices; a grouping part that compares the features for each of the information processing devices, and groups together the plurality of information processing devices each having similarity in the features; and an assigning part that, for each group into which the plurality of information processing devices is grouped together, assigns a work space that can be accessed by the plurality of information processing devices, and notifies the plurality of information processing devices, to which the work space has been assigned, of information related to the work space that allows the plurality of information processing devices to access the work space, wherein on the basis of the information related to the work space, the information processing devices access the work space assigned to the information processing devices.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIG. 4 is an explanatory drawing illustrating an example of text data extracted by a feature extraction part on a personal device basis according to one or more embodiments of the present invention;

FIG. 6 is an explanatory drawing illustrating an example of text data extracted from voice data by the feature extraction part on a personal device basis according to one or more embodiments of the present invention;

FIG. 8 is an explanatory drawing illustrating a configuration example of a similarity matrix according to one or more embodiments of the present invention;

DETAILED DESCRIPTION

Hereinafter, one or more embodiments of the present invention will be described with reference to the drawings. However, the scope of the invention is not limited to the disclosed embodiments. In the present description and the drawings, components having substantially identical functions or configurations are provided with identical reference numbers, and duplicate explanation thereof will be omitted.

First of all, a configuration example of a conference system according to one or more embodiments of the present invention will be described.

Figure 1:
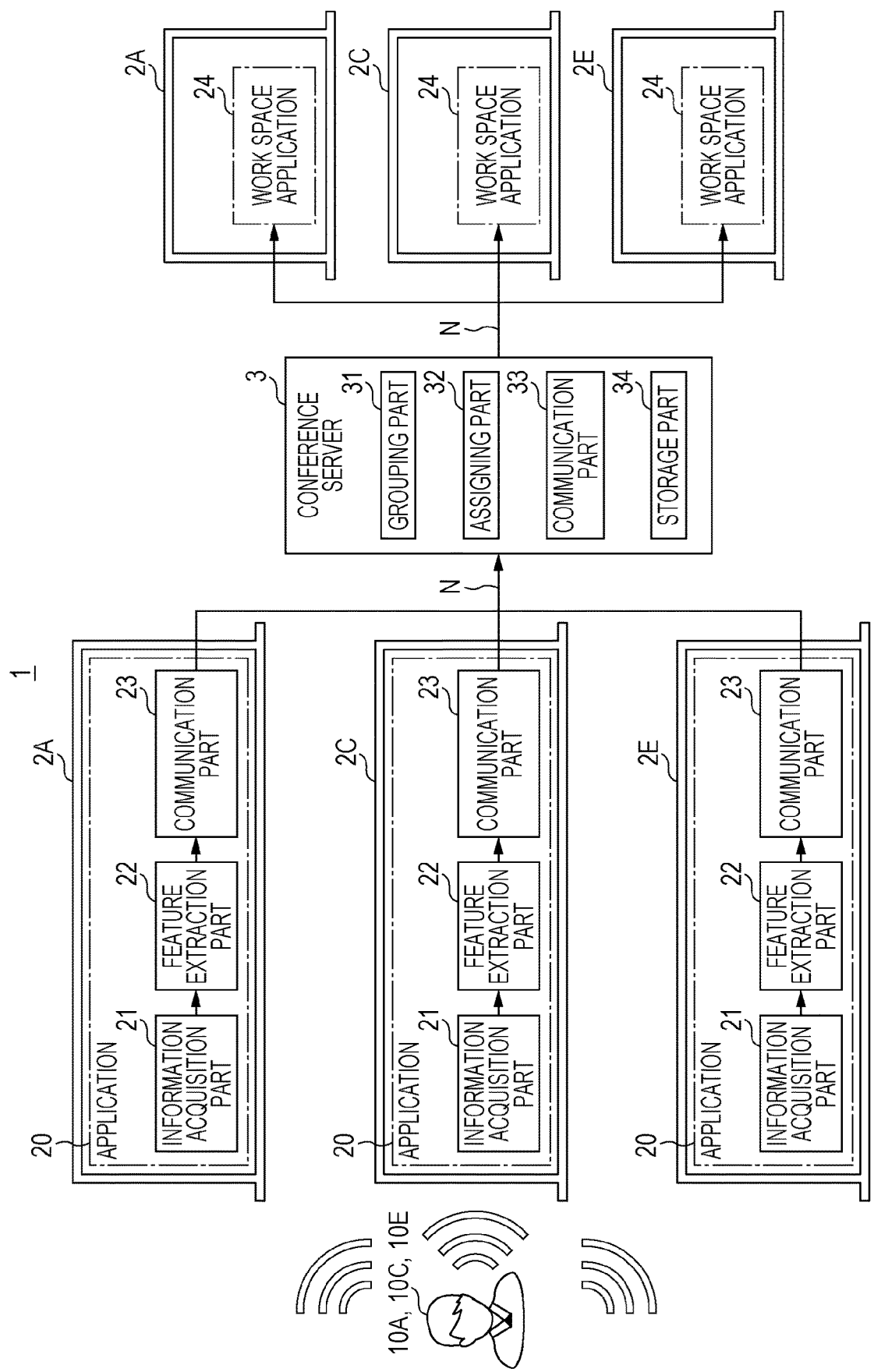
FIG. 1 is a block diagram illustrating, as an example, an overall configuration of a conference system according to one or more embodiments of the present invention.

FIG. 1 is a block diagram illustrating an example of an overall configuration of a conference system 1.

The conference system 1 is provided with three personal devices 2A, 2C, 2E (an example of an information processing device), and a conference server 3 (an example of a conference server) that is connected to the personal devices 2A, 2C, 2E through a network N such as a local area network (LAN). Incidentally, in order to indicate that a program that is started up in the personal devices 2A, 2C, 2E differs depending on processing of the conference server 3, the same personal devices 2A, 2C, 2E are shown on the left and right sides in the figure.

The personal devices 2A, 2C, 2E are used by participants 10A, 10C, 10E of a conference respectively. The participants 10A, 10C, 10E bring the personal devices 2A, 2C, 2E respectively, and gather at a common place where the conference is held. In the present description, for example, electronic apparatuses such as a notebook PC, a tablet, a smart phone and a smart watch are generically called "personal devices". It should be noted that the smart phone and the smart watch are mainly used to obtain voices of participants of the conference, and when work spaces are assigned to the smart phone and the smart watch, the notebook PC, the tablet or the like that is associated with the smart phone and the smart watch may access the work spaces. Main configurations of the personal devices used in the present description are the same, and therefore in a case where the personal devices are not distinguished thereamong in the following explanation, the personal devices are called "personal devices 2". In addition, in a case where the participants 10A, 10C, 10E are not distinguished thereamong, the participants are called "participants 10".

An example of an internal configuration of the personal device 2A will be described.

An application 20 is started in the personal device 2A. The application 20 is provided with an information acquisition part 21, a feature extraction part 22, and a communication part 23.

The application 20 is a program that is preinstalled in the personal device 2A. The participant 10A is in a state of logging into the application 20. The control of the application 20 causes the information acquisition part 21, the feature extraction part 22 and the communication part 23 to operate.

For each of the personal devices 2 used by the participants 10A, 10C, 10E of the conference, the information acquisition part 21 acquires, as information specific to a conference room (an example of an area) in which the conference is held, voice data obtained by converting voices of the participants 10A, 10C, 10E who are in the conference room. Here, the voices are analog data that have been collected by a microphone built into the personal device 2A. Therefore, the information acquisition part 21 digitizes analog data to convert the analog data into voice data, and then outputs the voice data to the feature extraction part 22.

The feature extraction part 22 extracts features from specific information obtained for each of the personal devices 2. Here, the feature extraction part 22 converts the voice data input from the information acquisition part 21 into text data, analyzes this text data, and extracts features of voices that show contents said by the participants 10A, 10C, 10E. The features of voices are represented by a character string corresponding to a predetermined time period, the character strings being extracted from the text data.

The communication part 23 transmits feature data indicating the features of voices extracted by the feature extraction part 22 to the conference server 3 through the network N. A uniform resource locator (URL) or the like that allows an access to the conference server 3 is held by the application 20 beforehand.

Although the volume of contents said by a speaker changes depending on a position at which the personal devices 2A, 2C, 2E are put in the conference room, the features of voices collected by the information acquisition parts 21 of the personal devices 2A, 2C, 2E are the same as, or similar to, the features of voices extracted by the feature extraction part 22. In addition, the personal devices 2C, 2E also transmit feature data of voices to the conference server 3 through the communication part 23.

The conference server 3 has a function of identifying a participant 10 on a conference basis, and assigning, to the personal device 2, a work space in which materials used in the conference can be browsed. This conference server 3 is, for example, a clouded service, and the large number of personal devices 2 are capable of transmitting/receiving various data to/from the conference server 3. Moreover, when the personal device 2 that is permitted to access a work space accesses the conference server 3 by using information related to the work space, the information being given from the conference server 3 to the personal device 2, the conference server 3 provides this personal device 2 with the work space. This conference server 3 is provided with a grouping part 31, an assigning part 32, a communication part 33, and a storage part 34.

The grouping part 31 compares voice features extracted by the feature extraction part 22 for each of the personal devices 2, and groups together the plurality of personal devices 2 that is similar in features. Here, the grouping part 31 compares a character string extracted as features for each of the personal devices 2 by using machine learning or character string matching algorithm, and groups together the personal devices 2 that are similar in character string. For example, the grouping part 31 compares voice feature data received from the personal devices 2A, 2C, 2E, and determines whether or not the personal devices 2A, 2C, 2E are being used in the same conference room. If it is determined that the personal devices 2A, 2C, 2E are being used in the same conference room, the grouping part 31 croups the personal devices 2A, 2C, 2E together. Incidentally, in one or more embodiments, the grouping part 31 groups together the personal devices 2 that are similar in character string features. However, the grouping part 31 is also capable of grouping together the personal devices 2 that are identical in character string features.

The assigning part 32 assigns a work space, which can be accessed by the plurality of personal devices 2, to each group made by grouping by the grouping part 31. For example, the assigning part 32 assigns, to the personal devices 2 grouped by the grouping part 31, a work space that allows the participants 10A, 10C, 10E to browse materials in a shared manner. In addition, the assigning part 32 notifies the personal devices 2A, 2C, 2E of information related to the work space, the information being required to access the work space.

The communication part 33 communicates with the communication part 23 provided in each of the personal devices 2A, 2C, 2E through the network N, and thereby is capable of transmitting/receiving various data to/from the communication part 23. For example, the communication part 33 receives feature data from the personal devices 2A, 2C, 2E. In addition, the communication part 33 transmits the information related to the work space notified by the assigning part 32 to the personal devices 2A, 2C, 2E.

The storage part 34 stores the feature data of the personal devices 2A, 2C, 2E received by the communication part 33. In addition, the storage part 34 also stores a threshold value that is referred to by the grouping part 31 in order to determine the similarity of each piece of feature data.

It should be noted that although not illustrated in FIG. 1, voice feature data is also transmitted from the personal devices 2 that are used by participants who participate in another conference. In this case, the communication part 33 also receives the feature data from the personal devices 2 that are used by the participants who participate in the another conference, and the grouping part 31 groups the personal devices 2 that are used by the participants who participate in the another conference. Subsequently, the assigning part 32 assigns another work space that allows the participants, who participate in the another conference, to browse materials, and notifies the personal devices 2, which are used by the participants who participate in the another conference, of information related to the work space assigned by the assigning part 32.

The personal devices 2A, 2C, 2E are capable of accessing the work space assigned to the personal devices 2A, 2C, 2E on the basis of the information related to the work space received from the conference server 3 by the communication part 23. Here, the personal devices 2A, 2C, 2E each start, through a native application or a Web browser, a work space application 24 that is used to access the work space assigned by the assigning part 32. The native application is an application that operates on the personal device 2A, 2C, 2E side, and corresponds to the work space application 24 shown in FIG. 1. In addition, the work space application 24 can also be started on a site of the conference server 3 accessed through the Web browser displayed in each of the personal devices 2A, 2C, 2E. The personal devices 2A, 2C, 2E each display conference information (materials, etc.), which can be used in the conference, on the display part provided in each of the personal devices 2A, 2C, 2E, the conference information being stored in the work space accessed through the work space application 24. This enables the participants of the conference to browse the conference information from the work space.

Figure 2:
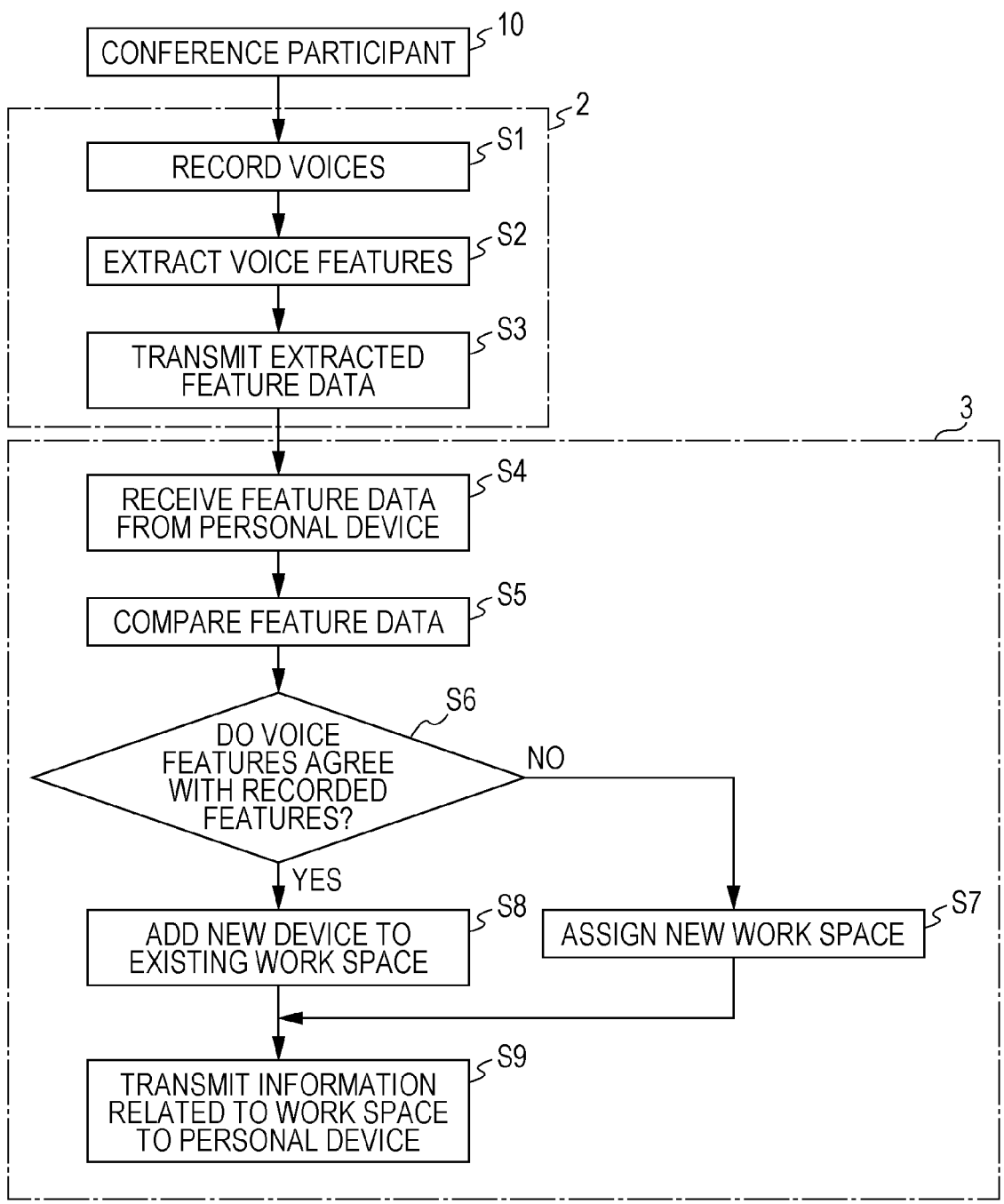
FIG. 2 is a flowchart illustrating, as an example, overall processing of the conference system according to one or more embodiments of the present invention.

FIG. 2 is a flowchart illustrating an example of overall processing of the conference system 1.

First of all, when any of the participants 10 who are in a conference room starts speaking, the personal devices 2 each convert voices acquired by the information acquisition part 21 through a built-in microphone into voice data, and then each record the voice data (S1). Incidentally, it is assumed that each of the participants 10 who are in the conference room brings at least one personal device 2 in the conference room. In addition, one participant 10 may bring two or more personal devices 2 (for example, a personal computer, a smart phone), and may start the application 20 by using the two or more personal devices 2.

Next, the feature extraction part 22 extracts voice features from the recorded voice data (S2). The voice features are, for example, text data that includes wording of a speech made at the start of a conference. Subsequently, the communication part 23 transmits, to the conference server 3, the feature data that includes the extracted voice features (S3).

The communication part 33 of the conference server 3 receives the feature data (S4). The grouping part 31 compares the feature data received from the personal device 2 with feature data stored in the storage part 34 (S5). The feature data that is initially stored in the storage part 34 is used as reference data that is compared with feature data received from the personal device 2 by the grouping part 31.

In addition, the grouping part 31 compares feature data that has been transmitted from all of the personal devices 2 with the reference data. At the time of this comparison, the grouping part 31 determines whether or not the feature data received from the personal device 2 agrees with the feature data (reference data) stored in the storage part 34 (S6). In a case where a similarity degree between a plurality of pieces of feature data, that is to say, a similarity degree between the feature data and the reference data, exceeds a threshold value, it is determined that the feature data agrees with the reference data.

Incidentally, when the conference server 3 first receives feature data, reference data is not stored in the storage part 34. Therefore, the feature data received from the personal device 2 does not agree with the feature data stored in the storage part 34. Accordingly, the grouping part 31 does not group the personal device 2 that has transmitted the feature data, and the assigning part 32 assigns a new work space to the personal device 2 that has transmitted this feature data (S7). In addition, the feature data that has been first received by the conference server 3 is stored in the storage part 34 as reference data.

Subsequently, when the conference server 3 receives feature data, the grouping part 31 compares newly received feature data with feature data (reference data) stored in the storage part 34, and consequently the personal device 2 that has newly transmitted the feature data can be grouped. In addition, in a case where the feature data (reference data) of the personal device 2 to which the new work space has been assigned in the step S7 agrees with feature data that has been received by the conference server 3 later, the assigning part 32 adds the personal device 2 that has transmitted the feature data to the conference server 3 later to an existing work space (S8).

Subsequently, the communication part 33 transmits information related to the work space, which has been assigned by the assigning part 32, to the personal device 2 that has transmitted the feature data (S9). As the information related to the work space, there are, for example, a URL, login information and the like that are used by the personal device 2 to access the work space. On the basis of information related to the work space, the information having been received from the conference server 3, the personal device 2 is capable of accessing the work space that is prepared for by the conference server 3.

It should be noted that the conference server 3 may concurrently receive a plurality of pieces of feature data transmitted from the plurality of personal devices 2. In this case, the conference server 3 stores, in the storage part 34, the plurality of pieces of feature data that has been concurrently received, and the grouping part 31 compares the plurality of pieces of feature data to determine whether or not the pieces of feature data agree with each other. In addition, in a case where the plurality of pieces of feature data agree with each other, one piece of feature data selected from the plurality of pieces of feature data is stored in the storage part 34 as reference data, and processing of a flowchart shown in FIG. 2 is performed.

Next, an example of processing in which work spaces that differ from each other are assigned to the personal device 2 used in a conference in which participants 10A, 10C, 10E participate, and to the personal device 2 used in a conference in which the participants 10B, 10D, 10E participate, respectively will be described with reference to FIGS. 3 to 6. It is assumed that the participants 10A, 10C, 10E gather in a conference room 1, and the participants 10B, 10D, 10F gather in a conference room 2, so as to hold respective conferences. In the figure, the personal devices 2 used by the participants 10A, 10C, 10E are abbreviated as "device A", "device C" and "device E" respectively. Similarly, the personal devices 2 used by the participants 10B, 10D, 10F are abbreviated as "device B", "device D" and "device F" respectively.

First of all, processing until a work space X is assigned to the participants 10A, 10C, 10E who are in the conference room 1 will be described.

Figure 3:
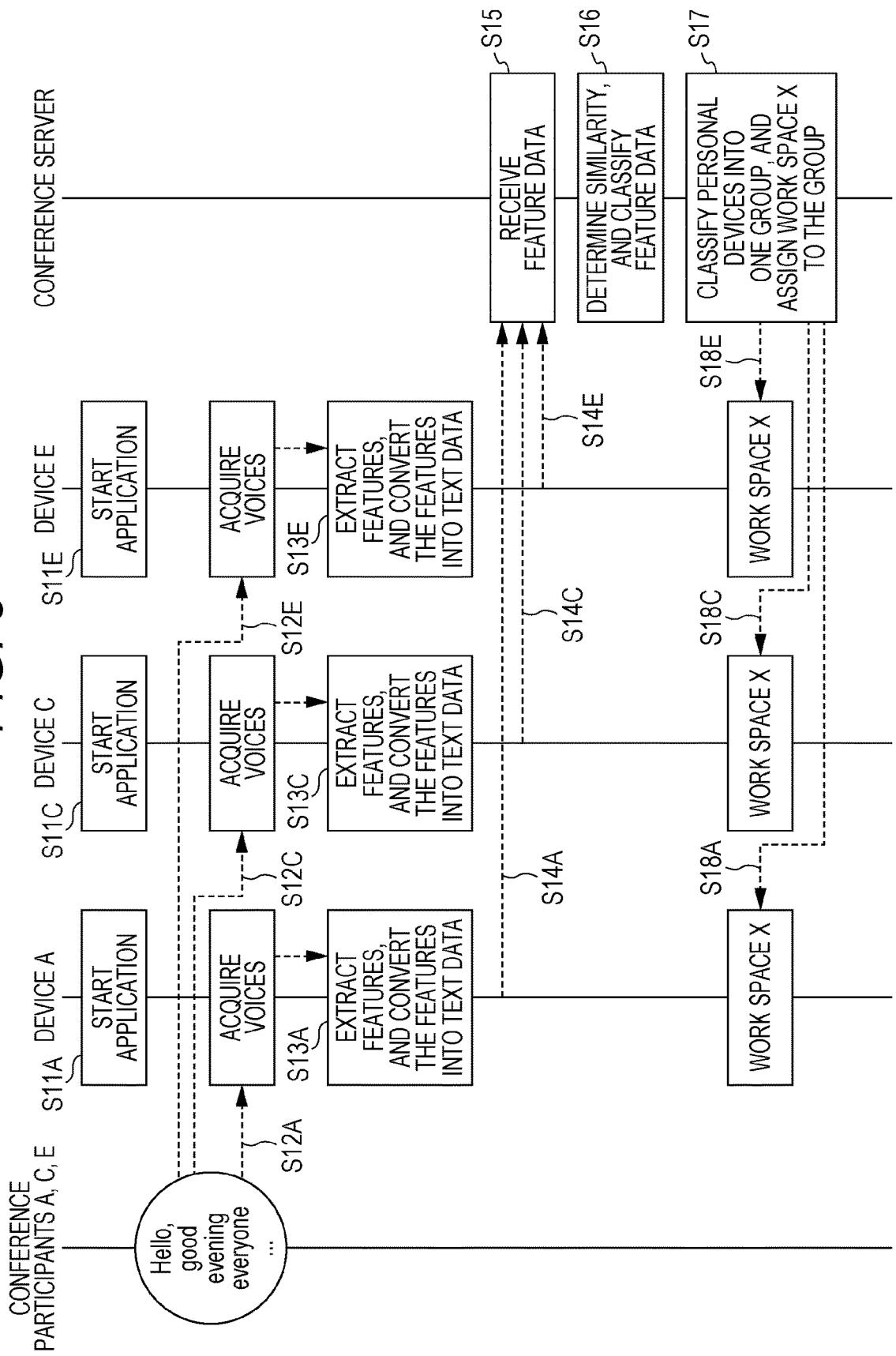
FIG. 3 is a sequence diagram illustrating an example of processing of, in a conference in which a participant who is in a conference room participates, assigning a work space to a personal device used by the participant, according to one or more embodiments of the present invention.

FIG. 3 is a sequence diagram illustrating an example of processing of, in the conference in which the participants 10A, 10C, 10E who are in the conference room 1 participate, assigning the work space X to the personal devices 2A, 2C, 2E used by the respective participants.

First of all, the personal devices 2A, 2C, 2E start the applications 20 respectively (S11A, S11C, S11E). After the application 20 of each of the personal devices 2 is started, one of the participants in the conference room 1 says "Hello, good evening everyone". The information acquisition parts 21 of the personal devices 2A, 2C, 2E each acquire a voice, and each convert the voice into voice data (S12A, S12C, S12E).

Subsequently, the feature extraction parts 22 of the personal devices 2A, 2C, 2E each extract features of the saying from the voice data, and each convert the features into text data (S13A, S13C, S13E).

Here, the text data that is extracted from the voice data by the feature extraction part 22 will be described.

FIG. 4 is an explanatory drawing illustrating an example of text data extracted by the feature extraction part 22 for each of the personal devices 2. A table shown in FIG. 4 is provided with fields of: "device name" of the personal device 2; and "extracted text data with time stamp".

Device names of the personal devices 2A, 2C, 2E are stored in the "device name" field.

In the field of "extracted text data with time stamp", an example of text data is shown, the text data having been extracted during a time period from a point of time $T_{start}$ at which the feature extraction part 22 has started extraction of the text data from voice data as features of saying to a point of time $T_{end}$ at which the extraction of the text data is ended.

$T_{start}$ and $T_{end}$ are both based on a soundless moment. However, for example, by setting $T_{start}$ and $T_{end}$ after a lapse of a fixed period of time from the start of the conference, the feature extraction part 22 may be adapted to extract text data from the middle of saying. In addition, the period before $T_{start}$ and the period after $T_{end}$ are time periods during which the feature extraction part 22 is not required to extract text data, and thus contents of saying are not limited. Therefore, these time periods are shown as "something" in the figure.

This example shows that the feature extraction part 22 of the personal device 2A has extracted "Hello good evening everyone" from the voice data, the feature extraction part 22 of the personal device 2C has extracted "Hello good evening everyone" from the voice data, and the feature extraction part 22 of the personal device 2E has extracted "Hello good evening one" from the voice data. A time stamp based on $T_{start}$ and $T_{end}$ is given to the feature data extracted from the voice data.

In addition, the feature extraction parts 22 on the personal device 2 side, which are used by the participant 10B, 10D, 10F, each convert voice data into text data by using a voice-to-test recognition application programming interface (API). However, depending on the distance from a speaker of the personal device 2, and the quality of voices acquired by the information acquisition part 21, words extracted from the voice data by the feature extraction part 22 of each of the personal devices 2 slightly differ. The feature extraction part 22 of each of the personal devices 2 separates the extracted words into groups, each having a plurality of words, by soundless time periods, each of which occurs before and after the participant 10 says a sentence, and converts the groups into text data. Moreover, the feature extraction part 22 attaches time stamps to text data to create feature data. Subsequently, the feature data is transmitted from the communication part 23 to the conference server 3. It should be noted that the feature extraction part 22 is not always required to separate words by soundless time periods, and voices obtained when the participant 10 speaks at the predetermined time may be converted into text data.

Here, a format of feature data transmitted from the communication part 23 to the conference server 3 is shown as follows.

Participant information+Text data+HHMMSS (the hour, minute, second of $T_{start}$)+HHMMSS (the hour, minute, second of $T_{end}$)

The "participant information" field indicates information that identifies the personal device 2. The participant information includes, for example, a login ID used when the application 20 has been logged in.

The "text data" field indicates a part of text data that has been extracted from voice data by the feature extraction part 22 for a predetermined time period.

HHMMSS (the hour, minute, second of $T_{start}$) represents the start timing of the predetermined time period during which the feature extraction part 22 extracts the text data.

HHMMSS (the hour, minute, second of $T_{end}$) represents the end timing of the predetermined time period during which the feature extraction part 22 extracts the text data.

The explanation returns to FIG. 3 again.

The communication part 23 of each of the personal devices 2 transmits the feature data, which has been extracted by the feature extraction part 22, to the conference server 3 (S14A, S14C, S14E). The communication part 33 of the conference server 3 receives the feature data transmitted from each of the personal devices 2 (S15).

The grouping part 31 of the conference server 3 determines the similarity of the feature data received from each of the personal devices 2 by the communication part 33, and classifies the feature data (S16). The conference server 3 is not capable of knowing beforehand at which position in each conference room the personal device 2 used by the participant 10 is placed. Therefore, it is necessary to determine the similarity of text data received from all devices connected to the conference server 3. Accordingly, in order to compare contents of sayings of the participants 10 who are in the conference room 1, the grouping part 31 selects text data, the time stamp of which is close, from among a plurality of pieces of feature data transmitted from the large number of personal devices 2. As the result, the grouping part 31 is capable of using text data, the time stamp of which is close, as a comparison target, and therefore the time required for comparison can be reduced.

Next, the grouping part 31 classifies the personal devices 2A, 2C, 2E that have transmitted feature data having high similarity into one group (grouping), and the assigning part 32 assigns the specific work space X to this group (S17).

In addition, through the communication part 33, the assigning part 32 notifies of information related to the work space X that has been assigned to the personal devices 2A, 2C, 2E (S18A, S18C, S18E). This enables the personal devices 2A, 2C, 2E to access the work space X on the basis of the information notified from the assigning part 32, and to display materials or the like. Therefore, the participants 10A, 10C, 10E of the conference are able to browse materials used in the conference.

Next, processing until a work space Y is assigned to the participants 10B, 10D, 10F who are in the conference room 2 will be described.

Figure 5:
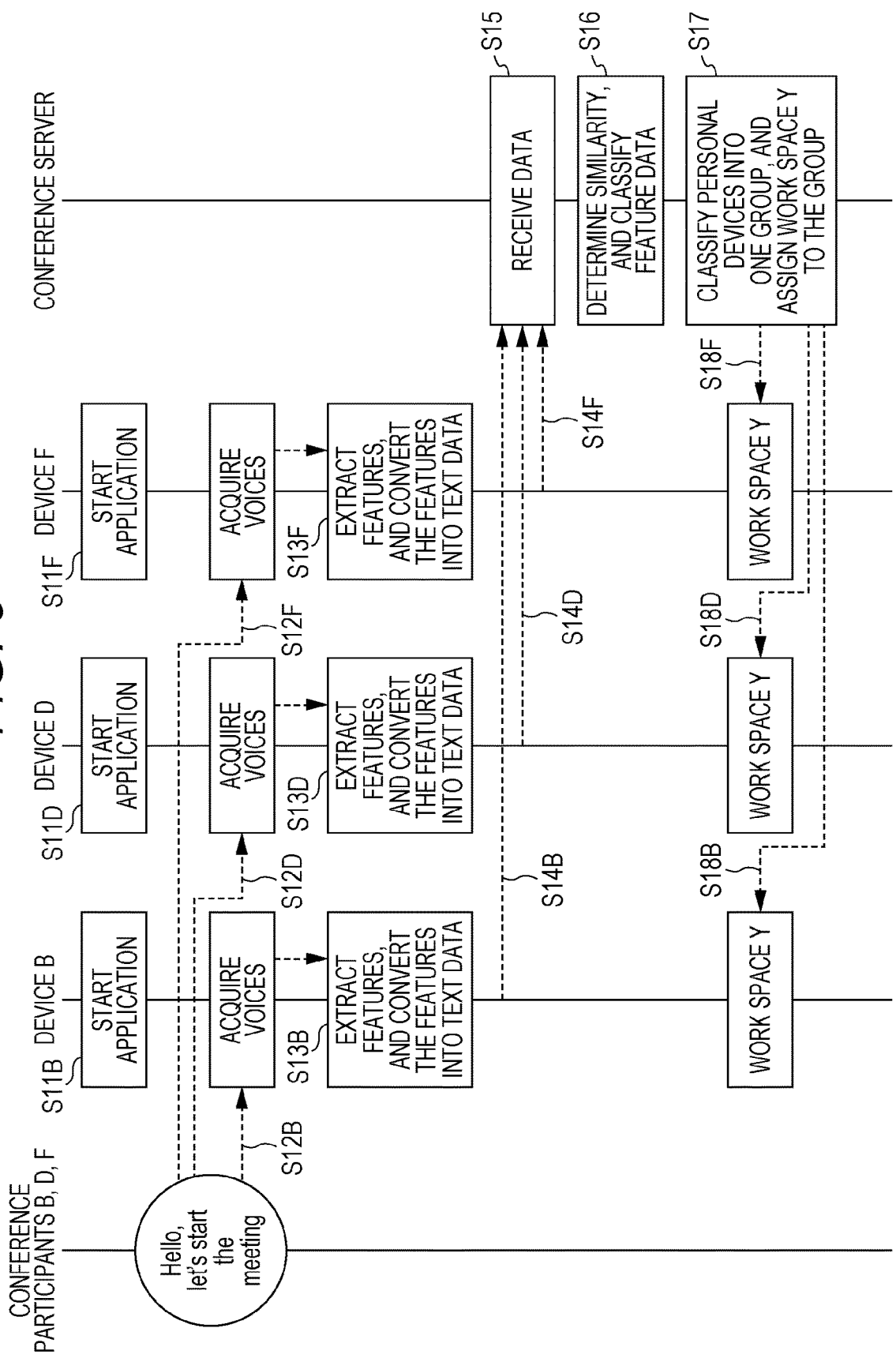
FIG. 5 is a sequence diagram illustrating an example of processing of, in a conference in which a participant who is in a conference room participates, assigning a work space to a personal device used by the participant, according to one or more embodiments of the present invention.

FIG. 5 is a sequence diagram illustrating an example of processing of, in the conference in which the participants 10B, 10D, 10F who are in the conference room 2 participate, assigning the work space Y to the personal devices 2B, 2D, 2F used by the respective participants.

The sequence diagram shown in FIG. 5 is substantially the same as the sequence diagram shown in FIG. 3. First of all, the personal devices 2B, 2D, 2F start the applications 20 respectively (S11B, S11D, S11F). It is assumed that one of the participants 10B, 10D, 10F who are in the conference room 2 said "Hello, let's start the meeting". The information acquisition parts 21 of the personal devices 2B, 2D, 2F each acquire a voice, and each convert the voice into voice data (S12B, S12D, S12F).

Subsequently, the feature extraction parts 22 of the personal devices 2B, 2D, 2F each extract features of the saying from the voice data, and each convert the features into text data (S13B, S13D, S13F).

FIG. 6 is an explanatory drawing illustrating an example of text data extracted from voice data by the feature extraction part 22 for each of the personal devices 2. A table shown in FIG. 6 is provided with fields of: "device name" of the personal device 2; and "extracted text data with time stamp". These fields shown in FIG. 6 are the same as the fields of the table shown in FIG. 4.

FIG. 6 shows that the feature extraction parts 22 of the personal devices 2B, 2D each has extracted "Hello let's start the meeting" from the voice data, and the feature extraction part 22 of the personal device 2F has extracted "Bello let's start meeting" from the voice data. A time stamp based on $T_{start}$ and $T_{end}$ is given to the feature data extracted from the voice data.

The explanation returns to FIG. 5 again.

The communication part 23 of each of the personal devices 2 transmits the feature data, which has been extracted by the feature extraction part 22, to the conference server 3 (S14B, S14D, S14F). Processing of the steps S15 and S16 performed by the conference server 3 is similar to the processing shown in FIG. 3, and therefore the explanation thereof will be omitted. Subsequently, the grouping part 31 of the conference server 3 classifies the personal devices 2B, 2D, 2F that have transmitted feature data having high similarity into one group (grouping), and the assigning part 32 assigns the specific work space Y to this group (S17).

In addition, through the communication part 33, the assigning part 32 notifies of information related to the work space Y that has been assigned to the personal devices 2B, 2D, 2F (S18B, S18D, S18F). This enables the personal devices 2B, 2D, 2F to access the work space Y on the basis of the information notified from the assigning part 32, and to display materials or the like. Therefore, the participants 10B, 10D, 10F of the conference are able to browse materials used in the conference.

Here, processing that is performed when the grouping part 31 determines the similarity of text data will be described.

Figure 7:
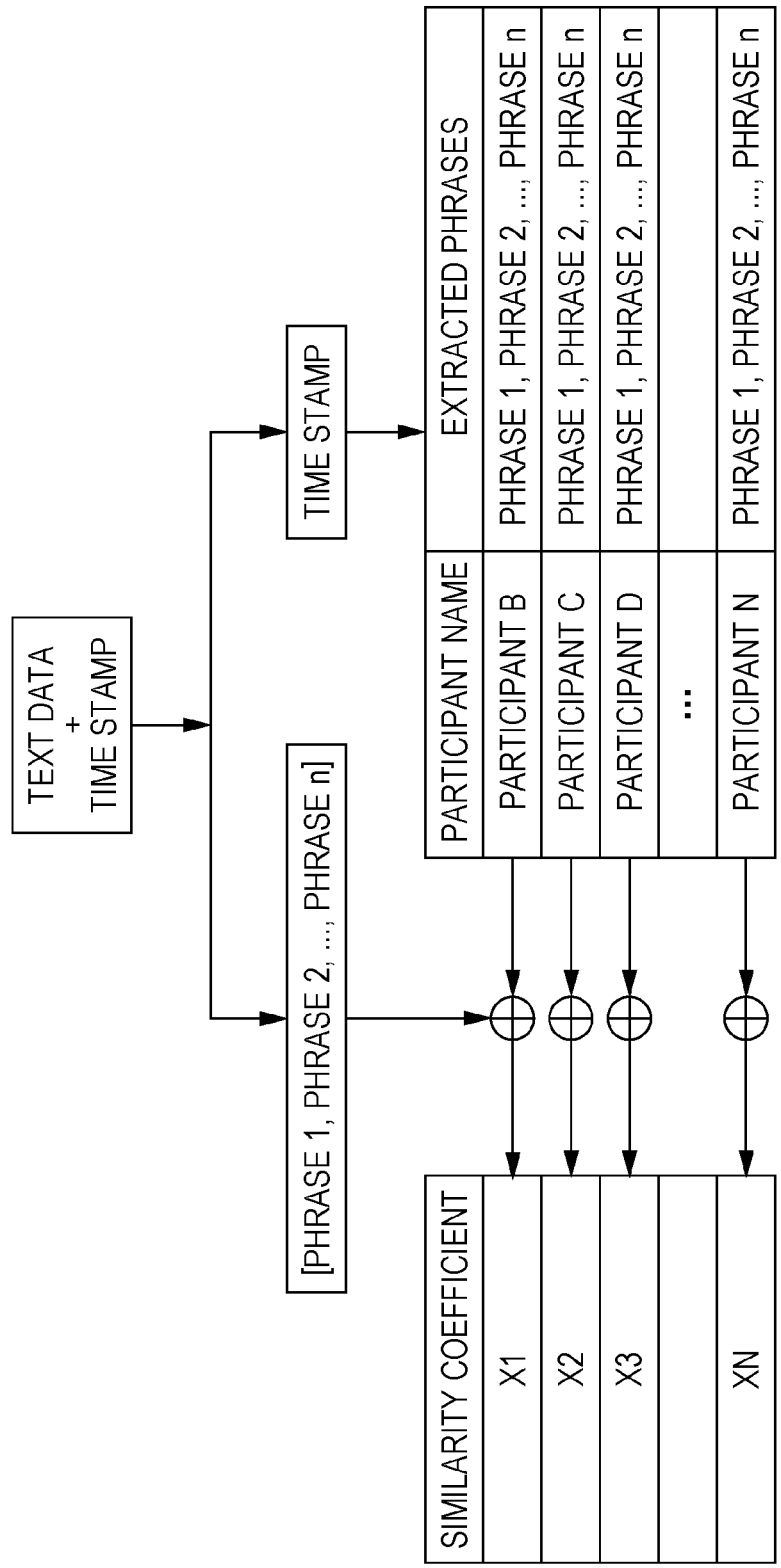
FIG. 7 is an explanatory drawing illustrating, as example, processing in which a grouping part groups feature data in which time stamps are close according to one or more embodiments of the present invention.

FIG. 7 is an explanatory drawing illustrating an example of processing in which the grouping part 31 groups feature data in which time stamps are close. The grouping part 31 compares, for example, feature data of the participant 10A with feature data of the other participants 10

The grouping part 31 stores features to which a time stamp has been added in the storage part 34, the time stamp indicating the time at which voices have been acquired by the information acquisition part 21, and compares features to which the time stamp has been added, the time stamp indicating the time at which voices have been acquired by another information acquisition part 21, with features that are stored in the storage part 34, and that are close in time stamp, thereby determining a similarity degree. For example, the grouping part 31 separates a time stamp from text data to which the time stamp has been added, the text data being an example of feature data received from the personal device 2A. In addition, the grouping part 31 resolves the text data into phrases. In the figure, phrases obtained by resolving the text data are shown as a phrase 1, a phrase 2, . . . a phrase n. In addition, the grouping part 31 also resolves, into phrases, text data included in feature data received from the other personal devices 2B to 2N other than the personal device 2A.

In addition, the grouping part 31 selects text data, the time stamp of which is close to the time stamp received from the personal device 2A, in other words, text data of voices collected in the timing that is substantially the same as the timing in which the participant 10A said, from a plurality of pieces of text data. It should be noted that there is also a case where sayings in different conference rooms are substantially the same in timing. Therefore, the grouping part 31 compares phrases obtained by resolving the text data received from the personal device 2A with phrases obtained by resolving text data received from each of the personal devices 2 in order. As the result of comparing each phrase on a device basis, similarity coefficients X1 to XN are determined for the participants 10B to 10N respectively. The value of the similarity coefficient can range from "0" to "1". A similarity coefficient that is closer to "0" indicates that phrases in a character string extracted from the text data as features are less similar, and a similarity coefficient that is closer to "1" indicates that phrases in a character string are more similar.

Substantially the same time stamp is attached to text data transmitted from the personal devices 2 in the same conference room to the conference server 3. Therefore, the grouping part 31 has only to extract, from the feature data, only text data to which substantially the same time stamp has been attached, and to make comparisons. As the result, text data of a large number of pieces of feature data extracted in different timings can be eliminated from comparison targets on the conference server 3 side, and therefore the number of times of processing in which the grouping part 31 compares text data can be reduced.

Here, it is assumed that each of the participants 10 who participates in the conference 1 held in the conference room 1, and each of the participants 10 who participates in the conference 2 held in the conference room 2, start saying substantially at the same time, and end the saying substantially at the same time. In this case, the grouping part 31 selects text data, the time stamp of which is close, as a comparison target. Therefore, from feature data received from each of the personal devices 2 in the conference rooms 1 and 2, the grouping part 31 extracts text data indicating voices made in the same time period. Here, even if the output of algorithm for converting voices collected by the information acquisition part 21 into text data is not correct, voices made in the same conference room are remarkably similar from the phonological point of view.

Therefore, by using character string matching algorithm that enables to identify a similar character string as a part said by the participant 10, the grouping part 31 is capable of comparing a plurality of pieces of text data to determine similarity of said contents. As the character string matching algorithm, for example, character string coincidence algorithm such as Levenshtein distance is used. In addition, the grouping part 31 calculates similarity degrees of all text data in which time stamps are close, and creates a similarity matrix.

Here, a similarity matrix that is used to calculate a similarity degree of text data by the grouping part 31 will be described.

FIG. 8 is an explanatory drawing illustrating a configuration example of a similarity matrix. This similarity matrix is formed by arranging reference numerals of "A" to "F" representing the personal devices 2A, 2C, 2E in the conference room 1 and the personal devices 2B, 2D, 2F in the conference room 2 along both the vertical axis and the horizontal axis. A cell at which the vertical axis and the horizontal axis intersect stores a similarity coefficient determined from text data obtained by comparing between two personal devices 2 by the grouping part 31.

The grouping part 31 creates a similarity matrix that stores similarity degrees indicating results of comparing features for each of the personal devices 2, and groups together the personal devices 2, each of which has a similarity degree higher than a threshold value, as the personal devices 2 that have similarity in features. For example, the personal devices 2A, 2C, 2E are placed in the conference room 1. Therefore, in the similarity matrix, a similarity coefficient of a cell at which the personal devices 2A, 2C intersect is "0.85", and a similarity coefficient of a cell at which the personal devices 2A, 2E intersect is "0.9", and thus the similarity coefficients are very high. Therefore, the personal devices 2A, 2C, 2E can be included in one group.

Meanwhile, a similarity coefficient of a cell at which the personal device 2A placed in the conference room 1 and the personal device 2B placed in the conference room 2 intersect is "0.1", and a similarity coefficient of a cell at which the personal devices 2A, 2D intersect is "0.15". Therefore, the personal devices 2A, 2B, 2D cannot be included in one group.

In this manner, although a similarity coefficient of voices received from the personal device 2 placed in the same conference room becomes higher, a similarity coefficient of voices received from the personal device 2 placed in a different conference room becomes lower. Here, among cells in FIG. 8, a cell, the similarity coefficient of which exceeds a threshold value (for example, "0.5"), is expressed by being filled with oblique lines. In addition, the grouping part 31 groups together the personal devices 2A, 2C, 2E, which are identified by cells each storing a similarity coefficient that exceeds the threshold value, and the assigning part 32 assigns the work space X to this group. Similarly, the grouping part 31 groups together the personal devices 2B, 2D, 2F, which are identified by cells each storing a similarity coefficient that exceeds the threshold value, and the assigning part 32 assigns the work space Y to this group.

Figure 9:
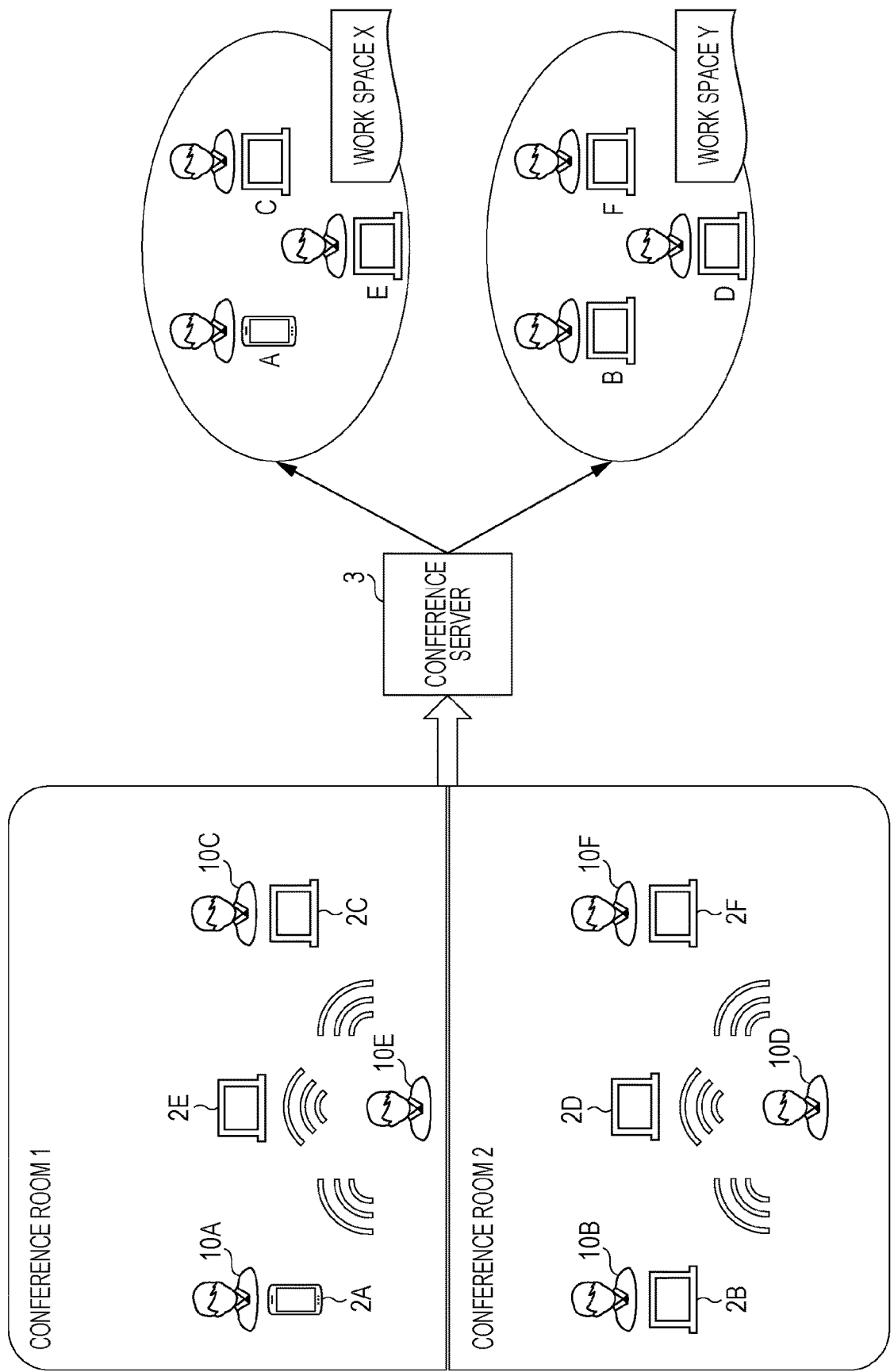
FIG. 9 is an explanatory drawing illustrating, as example, a work space that is assigned to each personal device according to one or more embodiments of the present invention.

FIG. 9 is an explanatory drawing illustrating an example of a work space that is assigned to each of the personal devices 2.

As described above, by using the similarity matrix shown in FIG. 8, the grouping part 31 of the conference server 3 groups together the personal devices 2 identified by the similarity coefficient that exceeds the threshold value, and the assigning part 32 assigns a work space on a group basis. Subsequently, each of the personal devices 2 is notified of the work space assigned by the assigning part 32. This enables the personal devices 2A, 2C, 2E to access the work space X.

Size of Compared Data and Threshold Value

The similarity coefficient of voices received from each of the personal devices 2 is determined in this manner. However, there is a possibility that voice inputs that have been concurrently obtained from the personal devices 2 placed in a plurality of conference rooms have the same contents. If the voice inputs have the same contents, the personal devices 2 placed in different conference rooms are recognized as the same group.

In order to prevent the personal device 2 placed in a different conference room from being recognized as the same group, it is necessary to make comparison data longer. Here, the conference server 3 receives data substantially in real time from all of the personal devices 2 connected to the conference server 3. As described above, in order to calculate similarity of comparison data by the conference server 3, the start timing ($T_{start}$) and the end timing ($T_{end}$) of a predetermined time period during which the feature extraction part 22 extracts text data is required.

However, if a character string extracted from text data longer is made longer, a load of processing in which the grouping part 31 performs matching of a character string received from each of the personal devices 2 increases. In addition, the grouping part 31 cannot classify a group until matching processing is completed, and the assigning part 32 cannot assign a work space. Therefore, the waiting time until each of the personal devices 2 is added to the work space also gets longer. Moreover, in order to perform matching of a long character string by the grouping part 31, the computational capacity of the conference server 3 must be enhanced.

However, in order to cause the grouping part 31 to perform matching of a character string, and thereby to determine similarity, a character string having approximately four or five words is sufficient. The character string having approximately four or five words corresponds to a voice input having a duration of two to three seconds. In addition, the threshold value is a value that is defined beforehand to classify the personal devices 2 into a group, and as shown in the example of the similarity matrix in FIG. 8, configuring the threshold value to be approximately "0.5" suffices. The time length during which the grouping part 31 compares a character string is inversely proportional to a length of a character string extracted from text data received by the conference server 3. Therefore, if the time length during which a character string is compared is long, the grouping part 31 is capable of grouping the personal devices 2 even if the threshold value is low.

In the conference system 1 according to one or more embodiments described above, feature data that has been created by converting a feature part extracted from voice data by the plurality of personal devices 2 placed in the conference room is transmitted to the conference server 3. The conference server 3 assigns a work space to the personal devices 2 that have been grouped together on the basis of text data having high similarity among pieces of text data extracted from feature data received from each of the personal devices 2. Subsequently, the conference server 3 notifies the personal devices 2 of information related to the work space. This enables the personal devices 2 to automatically access the work space on the basis of the information related to the work space, the information having been received from the conference server 3.

In this manner, since the personal devices 2 are capable of automatically accessing the work space, it is not necessary to set up, in the conference room, a special external device used to assign the work space. In addition, it is not necessary for the participants of the conference to search for an ID assigned to access the work space, or to search for a conference ID for accessing the work space from e-mails transmitted to the participants beforehand. In this manner, through the work space that is automatically accessed by the personal device 2, the participants of the conference are able to share materials used in the conference without spending time and effort.

Since the conference rooms are partitioned by a wall or the like, voices collected by the personal devices 2 in the conference room are limited to the contents said by participants in the conference room. However, there is also a case where in a conference that has been concurrently held in a plurality of conference rooms, a starting speech or the like performed in each conference room is the same. However, with the process of the conference, the contents said by participants of each conference room differ. Therefore, by comparing text data obtained by converting voice data acquired after the lapse of a predetermined length of time from the start of the conference, the conference server 3 is capable of correctly grouping the personal devices 2 according to the conference rooms used. In addition, a third person who is not participating in the conference can be prevented from accessing the work space.

Further, the amount of feature data that is transmitted from each of the personal devices 2 to the conference server 3 is very small. Accordingly, a bandwidth of the network N between each of the personal devices 2 and the conference server 3, which is required to transmit the feature data, can be narrowed.

In a conference system 1A according to one or more embodiments, each of the personal devices 2 transmits voice data, and the conference server 3 performs processing of converting a feature part extracted from the voice data into text data.

Figure 10:
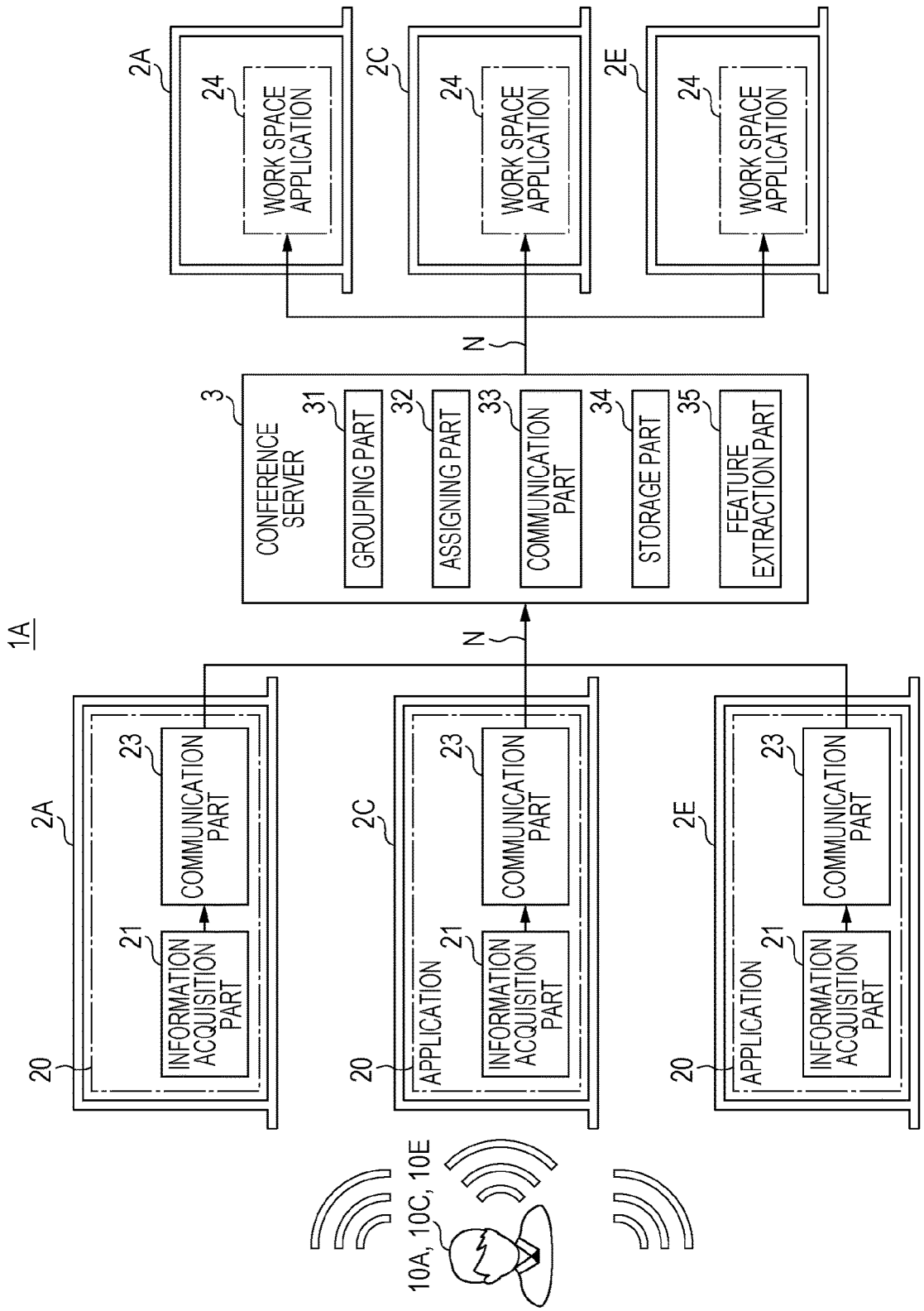
FIG. 10 is a block diagram illustrating, as an example, an overall configuration of a conference system according to one or more embodiments of the present invention.

FIG. 10 is a block diagram illustrating an example of an overall configuration of the conference system 1A.

The personal devices 2A, 2C, 2E that are provided in the conference system 1A is provided with the information acquisition part 21, and the communication part 23.

In addition, the conference server 3 is provided with not only the grouping part 31, the assigning part 32, the communication part 33, and the storage part 34 but also a feature extraction part 35. The feature extraction part 35 has functions similar to those of the feature extraction part 22 provided in the personal device 2.

The personal device 2 according to one or more embodiments transmits voice data, which has been obtained by converting voices acquired by the information acquisition part 21, to the conference server 3 through the communication part 23 without any change.

The feature extraction part 35 of the conference server 3 extracts features from the voice data received by the communication part 33, and then creates feature data. In addition, the grouping part 31 groups the personal devices 2 into groups on the basis of the feature data, and the assigning part 32 assigns a work space to each of the grouped groups.

Figure 11:
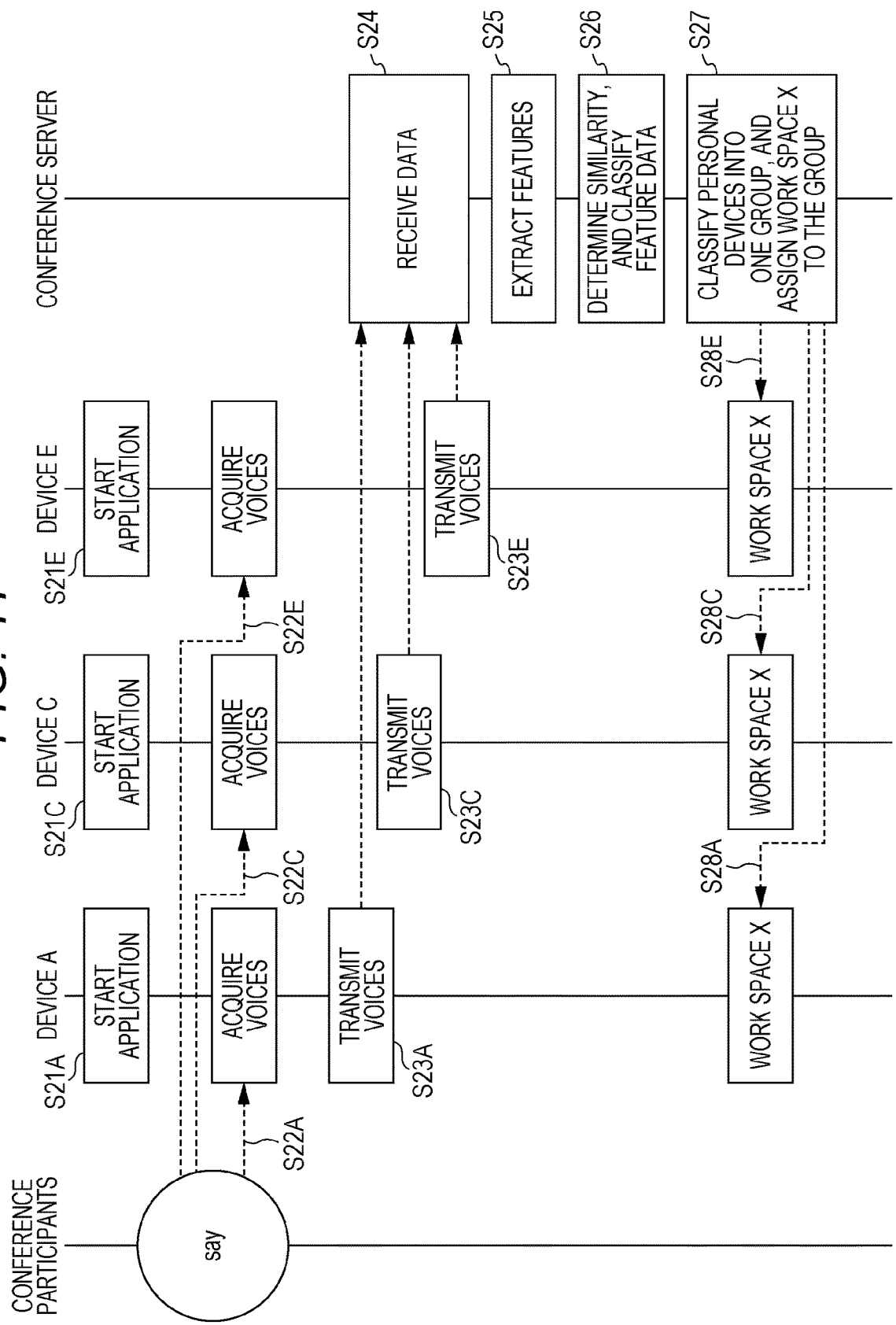
FIG. 11 is a sequence diagram illustrating an example of processing of, in a conference in which participants who are in the conference room participate, assigning a work space to a personal device used by each of the participants, according to one or more embodiments of the present invention.

FIG. 11 is a sequence diagram illustrating an example of processing of, in the conference in which the participants 10A, 10C, 10E who are in the conference room 1 participate, assigning the work space X to the personal devices 2A, 2C, 2E used by the respective participants.

First of all, the personal devices 2A, 2C, 2E start the applications 20 respectively (S21A, S21C, S21E). After the application 20 of each of the personal devices 2 is started, one of the participants in the conference room 1 says "say". The information acquisition parts 21 of the personal devices 2A, 2C, 2E each acquire a voice, and each convert the voice into voice data (S22A, S22C, S22E). In addition, the communication parts 23 of the personal devices 2A, 2C, 2E each transmit voice data to the conference server 3 (S23A, S23C, S23E).

Here, an example of a format of voice data that is transmitted from each of the personal devices 2A, 2C, 2E to the conference server 3 is shown as follows.

Voice Data+Participant Information

In the conference system 1A according to one or more embodiments, voice data, which has been obtained by converting voices acquired by the information acquisition part 21 during the conference, is continuously transmitted from the personal devices 2A, 2C, 2E to the conference server 3. Therefore, although participant information is given to the voice data, HHMMSS (the hour, minute, second of $T_{start}$) and HHMMSS (the hour, minute, second of $T_{end}$) are not given thereto. However, as contents of voices acquired by the information acquisition part 21 in this conference system 1A, for example, a comment or the like made by an organizer of the conference at the start of the conference is suitable. Therefore, pressing, by an organizer or a participant, a start button or the like provided in the application 20 at the start of the conference causes voice data to be transmitted to the conference server 3, for example, for five seconds.

The communication part 33 of the conference server 3 receives voice data from the personal devices 2A, 2C, 2E (S24). Next, the feature extraction part 35 of the conference server 3 extracts feature data from each of the pieces of received voice data (S25). Subsequently, the grouping part 31 of the conference server 3 determines similarity of the feature data extracted from each of the pieces of voice data, and then classifies the feature data (S26).

Next, the grouping part 31 groups together the personal devices 2A, 2C, 2E, each of which has transmitted feature data having high similarity, and the assigning part 32 assigns the work space X to the personal devices 2A, 2C, 2E that have been grouped together (S27). Through the communication part 33, the assigning part 32 notifies of information related to the work space X that has been assigned to the personal devices 2A, 2C, 2E (S28A, S28C, S28E). This enables the personal devices 2A, 2C, 2E to access the work space X on the basis of the information notified from the assigning part 32, and to display materials or the like.

In the conference system 1A according to one or more embodiments described above, each of the personal devices 2 transmits voice data to the conference server 3 as it is without extracting feature data from the voice data. Subsequently, the conference server 3 extracts feature data from the voice data. Here, processing of extracting feature data from the voice data consumes CPU resources. Therefore, adapting the conference server 3 provided with a CPU, the performance of which is higher than that of the personal device 2, to extract feature data from the voice data enables to reduce a processing load of the personal device 2.

It should be noted that in a case where a participant who has been late for a conference enters a conference room in the middle of the conference, pressing, by for example the participant who has been late for the conference, the start button or the like provided in the application 20 causes voice data to be transmitted from all of the personal devices 2 in the conference room to the conference server 3 for five seconds. Subsequently, if voice features during a time period during which the voice data has been transmitted indicate coincidence, the conference server 3 assigns a work space to the personal device 2 used by the participant who has been late for the conference. This enables even the participant who has been late for the conference to use the work space. In this manner, even if a participant enters the conference room in the middle of the conference, the conference system 1A is capable of executing processing of allowing the participant who has been late to use the work space without hindering the progress of the conference.

In the conference system 1 according to one or more embodiments, data other than text data is extracted from voice data as feature data. In one or more embodiments, the conference system 1 shown in FIG. 1 transmits feature data, which has been extracted from voice data by the personal device 2, to the conference server 3.

In one or more embodiments described above, the feature data extracted from the voice data is text data. However, the feature data is not limited to merely text data. This is because a voice signal collected by the information acquisition part 21 includes many useful features for identifying each of the personal devices 2.

Here, functions of extracting features from a voice signal can be roughly classified into a low-level function and a high-level function.

As the low-level function, there is, for example, a function of extracting features of voices by using short-term spectral characteristics calculated from a short frame of approximately 20 to 30 msec. Technologies such as mel-frequency cepstrum coefficients (MFCC), linear predictive coding coefficients (LPCC), line spectral frequencies (LSF), and perceptual linear prediction (PLP) are widely used to extract features from a voice signal. Therefore, the feature extraction part 22 may transmit the features extracted from the voice signal to the conference server 3 as feature data by using the technologies such as MFCC, LPCC, LSF and PLP. In addition, the conference server 3 is capable of grouping the personal devices 2 by identifying a conference on the basis of feature data received from the personal devices 2.

As the high-level function, there is, for example, a function of extracting voice features by using a style such as a custom learned by a speaker, and specific words or an idiolect (Idiolect) used by a speaker. The personal devices 2 may transmit, for example, features, which have been extracted from idioms, semantics, accents, pronunciations or the like when the participants of the conference said, to the conference server 3 as feature data. In this case as well, the conference server 3 is capable of grouping the personal devices 2 by identifying a conference on the basis of feature data received from the personal devices 2.

In the conference system 1 according to one or more embodiments described above, as a technology for extracting feature data from a voice signal, a technology other than the technology in which voice data is converted into text data is used. Even if such a technology is used, the conference server 3 is capable of discriminating features of a conference held in a certain conference room from features of a conference held in another conference room, and thereby is capable of assigning a work space to the personal devices 2.

In a conference system 1B according to one or more embodiments, the same work space as that assigned to the participants who are in the conference room can also be assigned to a participant who participates in the conference by using a video conferencing system.

While a remote conference is held, the personal device 2 of a participant who is in a remote location is not in the conference room. Therefore, in the prior art in which whether or not a participant who uses the personal device 2 participates in the same conference is checked by using the radio field intensity of wireless communications such as Bluetooth or WiFi, a conference in which a participant who is in a remote location participates cannot be identified. Here, the participant who is in the remote location participates in the conference by sharing voices made in the conference room. Therefore, the personal device 2 according to one or more embodiments collects voices emitted from a speaker of a video conference device, and then converts the voices into voice data. Subsequently, the conference server 3 compares feature data extracted from this voice data, and consequently a conference in which the participant participates can be identified.

Figure 12:
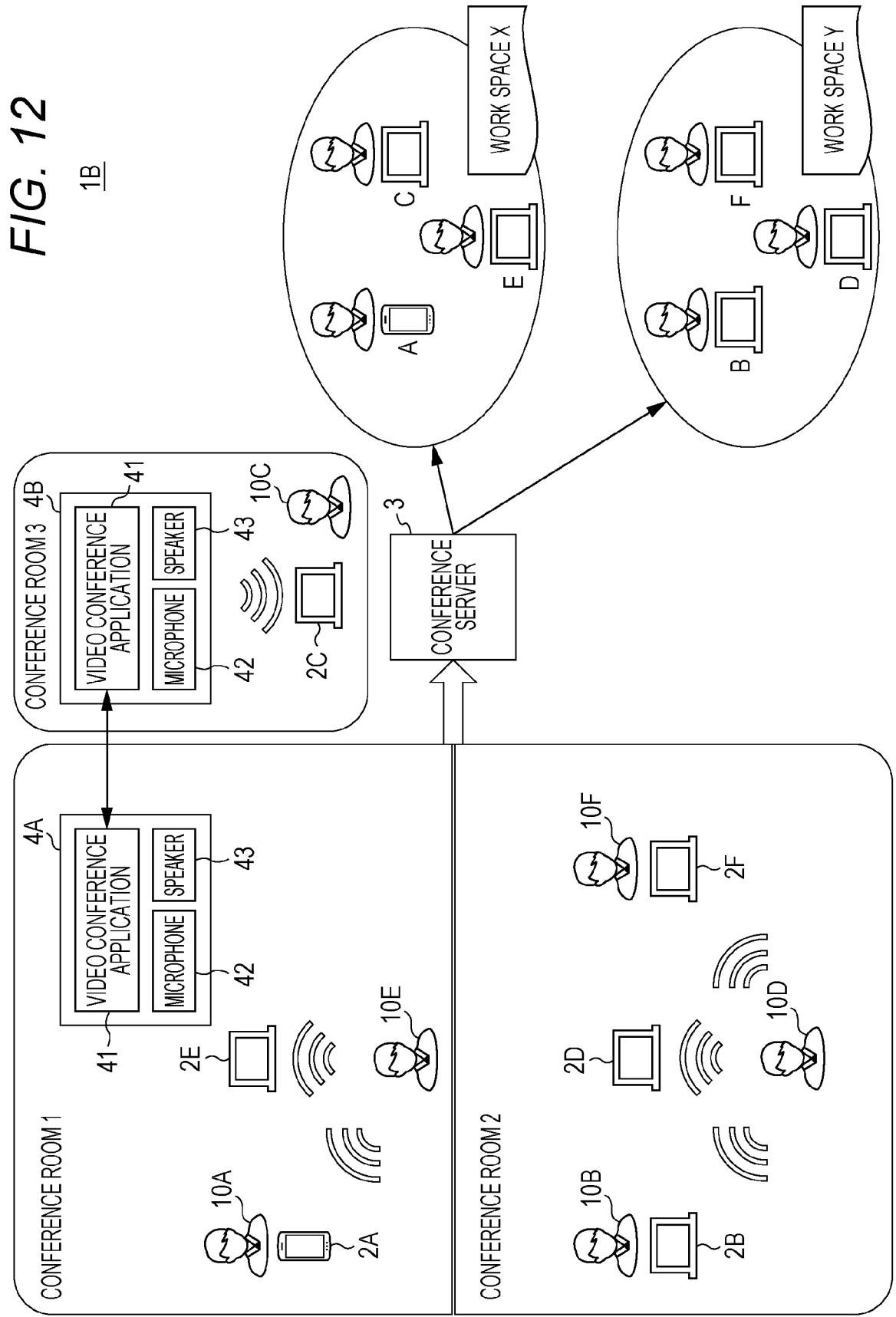
FIG. 12 is an overall configuration diagram illustrating, as an example, a work space that is assigned in a case where there is a participant who participates in a conference from a remote location by using a video conferencing system according to one or more embodiments of the present invention.

FIG. 12 is an overall configuration diagram illustrating an example of a work space assigned in a case where there is a participant who participates in a conference from a remote location by using a video conferencing system. Here, it is assumed that different conferences are concurrently held in the conference room 1 and the conference room 2 respectively. In addition, among the personal devices 2, a part of the personal devices 2 is placed in a conference room 3 that differs from the conference room 1, and the conference room 1 in which the conference is held is connected to the different conference room 3 by the video conferencing system.

Specifically, the participants 10A, 10E are in the conference room 1 in which a conference 1 is held. A video conference device 4A in which a video conference application 41 is started is installed in the conference room 1. The video conference application 41 is also started in a video conference device 4B used by the participant 10C who is in the conference room 3 that is separated from the conference room 1. The video conference devices 4A, 4B are each provided with a microphone 42 and a speaker 43.

Therefore, voices of the conference room 1 acquired by the information acquisition part 21 in the conference room 1 are output in the conference room 3 through the video conferencing system, and voices of the conference room 3 are output in the conference room 1 through the video conferencing system. In other words, the video conference device 4A installed in the conference room 1 converts voices of the participant 10A, 10E collected by the microphone 42 in the conference room 1 into voice data, and then transmits the voice data to the video conference device 4B installed in the conference room 3. The video conference device 4B installed in the conference room 3 outputs the voices of the participants 10A, 10E through the speaker 43. In contrast, the video conference device 4B installed in the conference room 3 converts voices of the participant 10C collected by the microphone 42 in the conference room 3 into voice data, and then transmits the voice data to the video conference device 4A installed in the conference room. Subsequently, the video conference device 4A installed in the conference room 1 outputs the voices of the participant 10C through the speaker 43.

The video conference application 41 performs the control in such a manner that voices made by the participants who are in the conference rooms 1, 3 are output without time difference through the video conference devices 4A, 4B that are installed in the conference rooms 1, 3 respectively. Therefore, voices collected by the information acquisition parts 21 of the personal devices 2A, 2C, 2E respectively in the same timing have substantially the same contents.

Accordingly, the feature extraction parts 22 of the personal devices 2A, 2C, 2E are capable of extracting features from voices acquired by the personal devices 2A, 2E in the conference room 1, and from voices acquired by the personal device 2C in the conference room 3. In addition, the communication part 23 transmits feature data to the conference server 3. FIG. 12 illustrates an example in which the personal devices 2 in the conference room 1 transmit feature data to the conference server 3. However, the personal device 2 in the conference room 3 may transmit feature data to the conference server 3. Subsequently, the conference server 3 compares the feature data received from each of the personal devices 2, classifies the personal devices 2, and assigns a work space to the personal devices 2.

In the conference system 1B according to one or more embodiments described above, even in the case of a conference in which a participant who is away from a conference room participates, the same work space is assigned to the personal device 2 used by a participant who is in the conference room, and the personal device 2 used by the participant who is away from the conference room. Therefore, in the conference system 1B according to one or more embodiments, even when not all participants are in the conference room, the work space assigned to the participants who participate in the same conference can be used.

It should be noted that there is also a case where the microphone 42 cannot directly receive voices made by participants in a video conference. For example, in a case where the participant 10C who is in a remote location uses a headphone to hear contents of a conference held in the conference room 1, voices output from the headphone cannot be collected by the information acquisition part 21 of the personal device 2C. In this case, an application having a function of a call recorder that is capable of recording voices output from the headphone is started in the personal device 2C, and the personal device 2C is connected to the video conference device 4B. As the result, even in a case where the headphone is connected to the video conference device 4B, an application of the call recorder of the personal device 2 is capable of recording voices occurring in the conference rooms 1, 3. In addition, the application 20 of the personal device 2 is capable of extracting feature data from recorded data to transmit the feature data to the conference server 3.

It should be noted that the video conference application 41 preinstalled in any of the personal devices 2 used by the participants who are in the conference room may be started. Similarly, the video conference application 41 preinstalled in the personal device 2C used by the participant 10C who is in the remote location may be started. This enables to hold a video conference without preparing the video conference devices 4A, 4B.

In addition, in one or more embodiments, as a configuration in which the conference server 3 is provided with the feature extraction part 35, the feature extraction part 35 may extract saying features from voice data.

In a conference system 1C according to one or more embodiments, a smooth progress of a conference can be made by a voice assistant device provided in the conference room.

In recent years, voice assistant devices targeted for workplaces are being developed. The voice assistant devices are generally driven by artificial intelligence (AI). In addition, if functions of the voice assistant devices are enhanced, it is considered that a function of supporting participants is provided in a conference by executing tasks of, for example, scheduling of a conference, notification to participants, and recommendation of information. If a voice assistant device performs such conference support, participants of a conference easily accept the voice assistant device. Therefore, an example in which a voice assistant device is provided in a conference room will be described.

Figure 13:
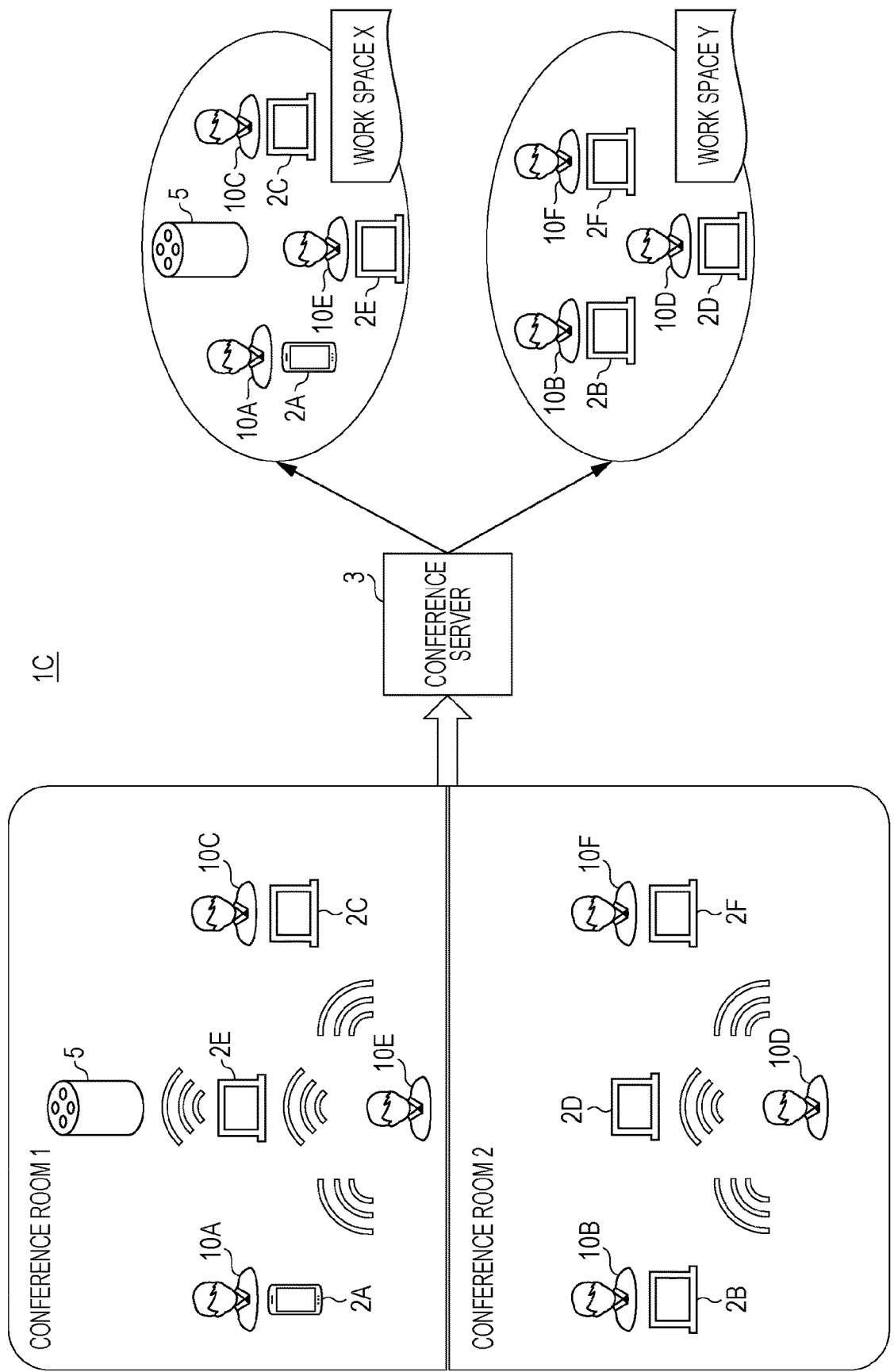
FIG. 13 is an overall configuration diagram of a conference system, the overall configuration diagram illustrating a state of the conference room in which a voice assistant device is provided according to one or more embodiments of the present invention.

FIG. 13 is an overall configuration diagram illustrating the conference system 1C, and showing a state of the conference room 1 in which a voice assistant device 5 is provided.

It is assumed that a part of an information processing device that forms the conference system 1C is the voice assistant device 5 provided in the conference room 1. The voice assistant device 5 is an example of a conference support device that outputs information for supporting a conference held in the conference room 1, and is capable of supporting a smooth progress of the conference. The voice assistant device 5 has a function of not only collecting voices emitted during the conference, but also providing information related to a conference held before by the same participants to the participants of the conference held this time, and adjusting a schedule of a conference that will be held next time. The voice assistant device 5 has a function of collecting voices in the conference room, and transmitting voice data to the conference server 3.

Voices collected by the voice assistant device 5 are the same as voices collected by the personal devices 2 of the participants, and therefore the conference server 3 determines that the voice assistant device 5 and the personal devices 2 are in the same conference room 1. Therefore, the conference server 3 transmits information for supporting the conference held in the conference room 1 to the voice assistant device 5. The voice assistant device 5 outputs information for supporting the conference according to a work space assigned by the assigning part 32. For example, if schedules of the participants are linked to the work space, the voice assistant device 5 is capable of referring to the schedules of the participants, and thereby providing the participants with information suitable for holding a conference. This enables the voice assistant device 5 to support the conference by voices in such a manner that each participant can smoothly make progress in the conference.

In the conference system 1C according to one or more embodiments described above, the voice assistant device 5 provided in the conference room 1 is capable of supporting a conference by voices for the participants of the conference. Therefore, the participants of the conference are able to make the conference smoothly progress by using information supported from the voice assistant device 5.

In addition, the voice assistant device 5 is capable of accessing a work space that has been automatically assigned on a conference basis. Therefore, participants of a conference are not required to perform setting of the voice assistant device 5 for accessing the work space.

Next, a hardware configuration of a computer C that forms respective devices of the conference systems 1, 1A, 1B, 1C will be described.

Figure 14:
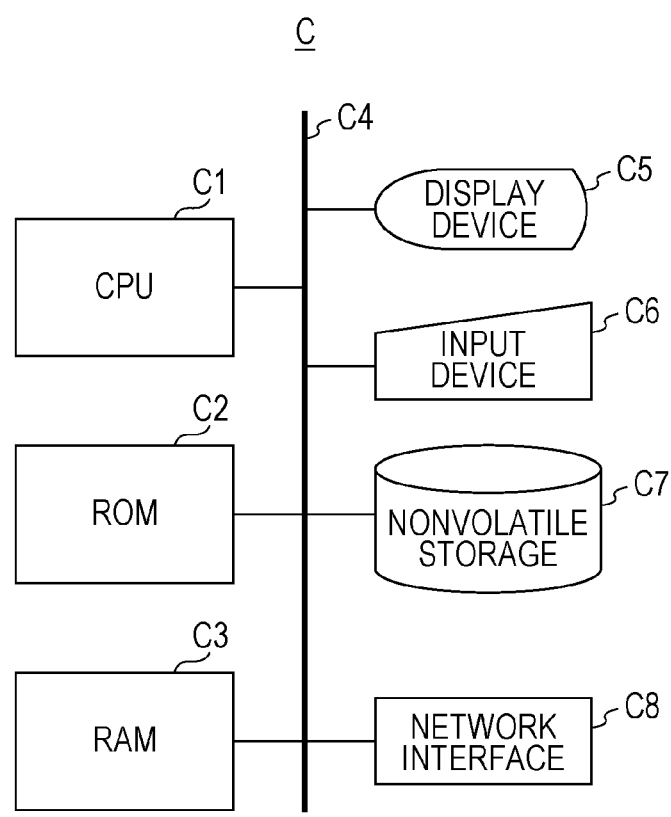
FIG. 14 is a block diagram illustrating, as an example, a hardware configuration of a computer according to one or more embodiments of the present invention.

FIG. 14 is a block diagram illustrating an example of a hardware configuration of the computer C.

The computer C is, what is called, hardware used as a computer. The computer C is provided with a central processing unit (CPU) C1, a read only memory (ROM) C2, and a random access memory (RAM) C3 that are connected to a bus C4. Moreover, the computer C is further provided with a display device C5, an input device C6, a nonvolatile storage C7, and a network interface C8.

The CPU C1 reads a software program code that realizes each function according to one or more embodiments from the ROM C2, and then executes the software program code. Variables, parameters and the like that have occurred in the middle of computation processing are temporarily written to the RAM C3. For example, by executing the software program code using the CPU C1 provided in the personal device 2, functions of the information acquisition part 21 and the feature extraction part 22 are realized. Similarly, by executing the software program code provided in the conference server 3, functions of the grouping part 31, the assigning part 32, and the feature extraction part 35 are realized.

The display device C5 is, for example, a liquid crystal display monitor, and displays results of processing executed in the computer C for the participants of the conference. For example, a keyboard, a mouse or the like is used as the input device C6, and a participant of a conference is allowed to perform predetermined manipulation input, and an instruction.

As the nonvolatile storage C7, for example, a hard disk drive (HDD), a solid state drive (SSD), a flexible disk, an optical disk, a magneto-optical disk, a CD-ROM, a CD-R, a magnetic tape, a nonvolatile memory or the like is used. This nonvolatile storage C7 records not only an operating system (OS), various parameters but also a program that causes the computer C to function. Each of the ROM C2 and the nonvolatile storage C7 permanently records a program, data and the like required by the CPU C1 to operate, and is used as an example of a computer readable non-transitory recording medium that stores a program executed by the computer C. For example, a nonvolatile storage C7 provided in the personal device 2 records a program that can execute the application 20. In addition, a function of the storage part 34 is realized by the nonvolatile storage C7 provided in the conference server 3.

For example, a network interface card (NIC) or the like is used as the network interface C8, and various data can be transmitted and received between devices through a LAN, an exclusive line or the like, the terminal of which is connected. For example, the network interface C8 provided in the personal device 2 realizes a function of the communication part 23. Similarly, the network interface C8 provided in the conference server 3 realizes a function of the communication part 33.

Modified Example

Incidentally, in recent years, there is the personal device 2 that is provided with an optical sensor capable of measuring illuminance Therefore, a wavelength, or a change in illuminance, of illumination light emitted from an illumination device provided in a conference room for a predetermined time period is measured by an optical sensor as specific information, and a result of the measurement by the optical sensor may be extracted as features on a conference basis. For example, if the illumination device differs on a conference room basis, a wavelength of illumination light emitted from each illumination device differs on a conference room basis. In addition, when materials are projected on a screen by a projector, the illumination of a conference room is often switched off. Accordingly, the personal device 2 extracts, as features of the conference room, a change in illuminance measured by the optical sensor before and after the illumination of the conference room has been switched off, and transmits this feature data to the conference server 3. Further, the conference server 3 receives the feature data from each of the personal devices 2, classifies the personal devices 2 each corresponding to coincident feature data as one group, and consequently is capable of assigning a work space to the personal devices 2 that are classified as one group. In this manner, by using a wavelength, or a change in illuminance, of illumination light of a conference room as features of a conference, a work space is assigned to each of the personal devices 2 before the conference is started. This enables each of the personal devices 2 to access the work space beforehand.

In addition, as an example of an area in which a conference is started, a conference room partitioned by a wall or the like has been mentioned. However, an open space that does not have a wall or the like, and that is used to hold a meeting, may be used as the area. Participants of a meeting held in an open space give voices at close distances from one another, and therefore the information acquisition part 21 provided in the personal device 2 possessed by each participant is capable of collecting voices made by the participants by using a microphone. Therefore, a work space can also be assigned to the personal device 2 possessed by each participant.

In addition, the processing of extracting, by the feature extraction part 22, features from text data converted from voice data may be performed targeted for, for example, such voice data that the volume of voices collected by the information acquisition part 21 by using a microphone exceeds a predetermined value. For example, even if a third person who is not a participant of a conference brings the personal device 2 close to the conference through a door of a conference room, the volume of voices leaking from the conference room does not exceed the predetermined value, and therefore processing of extracting features from text data is not performed. This enables to avoid a situation in which a third person accesses a work space.

In addition, the present invention is not limited to the above-described embodiments, and needless to say, may take other various application examples and modified examples unless deviating from the gist of the present invention set forth in claims.

For example, in one or more embodiments described above, configurations of the device and the system have been explained in detail and specifically so as to explain the present invention understandably, and therefore the present invention is not always limited to the invention having all of the explained configurations. Moreover, a part of the configuration in one or more embodiments explained here can be replaced with the configuration of the above-described embodiments, and the configuration of the above-described embodiments may be added to a configuration of certain embodiments described-below. Further, for a part of a configuration of one or more embodiments, it is also possible to make an addition, deletion, or substitution of another configuration.

Furthermore, the control line and the information line are indicated when they are considered to be required for convenience of explanation, and therefore the control lines and the information lines are not always all indicated on a product. In actuality, it may be considered that almost all of the configurations are mutually connected to one another.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. A conference system comprising:
a central processing unit (CPU) that:
acquires participant voices for each of information processing devices used by participants of a conference in a first area in which the conference is held;
converts the participant voices into voice data;
converts the voice data into text data;
extracts a character string that corresponds to a predetermined time period from the text data as features;
compares the features of each of the information processing devices with one another;
selects, among the information processing devices, first information processing devices that acquire voice data from a single participant based on the features and groups the first information processing devices together;
assigns, for a group of the first information processing devices, a work space that can be accessed by the first information processing devices; and
notifies the first information processing devices of information related to the work space that allows the first information processing devices to access the work space assigned to the first information processing devices,
wherein the first information processing devices access the work space using the information related to the work space.

2. The conference system according to claim 1, wherein the CPU further:
extracts a plurality of character strings, wherein each of the plurality of character strings is associated with one of the information processing devices;
compares the plurality of character strings using machine learning or string matching algorithm; and
groups together the first information processing devices with a similar character string.

3. The conference system according to claim 2, wherein the CPU further:
compares the features of each of the information processing devices to generate a similarity degree for each of the information processing devices;
creates a similarity matrix that stores the similarity degree for each of the information processing devices; and
groups together the first information processing devices with similarity degrees higher than a threshold value.

4. The conference system according to claim 3, wherein the CPU further:
stores, in a memory and with a first time stamp that indicates a time at which the participant voices were acquired, the features; and
compares a second time stamp that indicates a time at which the participant voices have been acquired by another information processing device with the first time stamp to determine the similarity degree.

5. The conference system according to claim 1, wherein among the information processing devices, some of the information processing devices are disposed in a second area that differs from the first area and is connected to the first area by a video conferencing system,
the participant voices acquired in the first area are output in the second area through the video conferencing system and the participant voices of the second area are output to the first area through the video conferencing system, and the CPU further extracts the features from the participant voices acquired in the first area and from participant voices acquired in the second area.

6. The conference system according to claim 1, wherein among the information processing devices, a portion of the information processing devices is a conference support device that is disposed in the first area and that outputs information used to support the conference held in the first area, and
the conference support device outputs information used to support the conference according to the assigned work space.

7. The conference system according to claim 1, wherein through a native application or a Web browser, the information processing devices start a work space application for accessing the assigned work space, and
through the assigned work space accessed from the work space application, the information processing devices display conference information that is used in the conference on a display disposed in each of the information processing devices.

8. The conference system according to claim 7, wherein:
the information processing devices acquire the information specific to the first area and extract the features from the information specific to the first area, and
a conference server that is connected to the information processing devices through a network and that is arranged as a cloud server assigns the work space.

9. The conference system according to claim 7, wherein:
the information processing devices acquire the information specific to the first area, and
a conference server that is connected to the information processing devices through a network and that is arranged as a cloud server extracts the features from the information specific to the first area and assigns the work space.

10. A conference system comprising:
a central processing unit (CPU) that:
 acquires, for each of information processing devices used by participants of a conference, illumination light of a first area or illuminance of a first area;
 extracts a wavelength of the illumination light or a change in the illuminance in the first area during a predetermined time period as features;
 compares the features of each of the information processing devices with one another;
 selects, among the information processing devices, first information processing devices based on the features and group the first information processing devices together;
 assigns, for a group of the first information processing devices, a work space that can be accessed by the first information processing devices; and
 notifies the first information processing devices of information related to the work space that allows the first information processing devices to access the work space assigned to the first information processing devices,
 wherein the first information processing devices access the work space using the information related to the work space.

11. The conference system according to claim 1, wherein the first area is a conference room.

12. A conference server comprising:
a central processing unit (CPU) that:
 acquires participant voices in a first area in which a conference is held, wherein the participant voices are obtained by information processing devices used by participants of the conference;
 converts the participant voices into voice data;
 converts the voice data into text data;
 extracts a character string that corresponds to a predetermined time period from the text data as features;
 compares the features of each of the information processing devices with one another;
 selects, among the information processing devices, first information processing devices that acquire voice data from a single participant based on the features and groups the first information processing devices together;
 assigns, for a group of the first information processing devices, a work space that can be accessed by the first information processing devices; and
 notifies the first information processing devices of information related to the work space that allows the first information processing devices to access the work space assigned to the first information processing devices.

13. The conference server according to claim 12, wherein the CPU further:
 extracts a plurality of character strings, wherein each of the plurality of character strings is associated with one of the information processing devices;
 compares the plurality of character strings using machine learning or string matching algorithm; and
 groups together the first information processing devices with a similar character string.

14. The conference server according to claim 13, wherein the CPU further:
 compares the features of each of the information processing devices to generate a similarity degree for each of the information processing devices;
 creates a similarity matrix that stores the similarity degree for each of the information processing devices; and
 groups together the first information processing devices with similarity degrees higher than a threshold value.

15. The conference server according to claim 14, wherein the CPU further:
 stores, in a memory and with a first time stamp that indicates a time at which the participant voices were acquired, the features; and
 compares a second time stamp that indicates a time at which the participant voices have been acquired by another information processing device with the first time stamp to determine the similarity degree.

16. The conference server according to claim 12, wherein among the information processing devices, some of the information processing devices are disposed in a second area that differs from the first area and is connected to the first area by a video conference server,
the participant voices acquired in the first area are output in the second area through the video conference server and the participant voices of the second area are output to the first area through the video conference server, and
the CPU further extracts the features from the participant voices acquired in the first area and from participant voices acquired in the second area.

17. A conference server comprising:
a central processing unit (CPU) that:
 extracts a wavelength of illumination light or a change in illuminance in a first area in which a conference is held during a predetermined time period as features, wherein the wavelength of the illumination light or the change in the illuminance is obtained by information processing devices used by participants of the conference;

compares the features of each of the information processing devices with one another;

selects, among the information processing devices, first information processing devices that acquire voice data from a single participant based on the features and groups the first information processing devices together;

assigns, for a group of the first information processing devices, a work space that can be accessed by the first information processing devices; and notifies the first information processing devices of information related to the work space that allows the first information processing devices to access the work space assigned to the first information processing devices.

18. The conference server according to claim 12, wherein the first area is a conference room.

19. A non-transitory recording medium storing a computer readable program causing a computer to:

acquire participant voices in a first area in which a conference is held, wherein the participant voices are obtained by information processing devices used by participants of the conference;

convert the participant voices into voice data;

convert the voice data into text data;

extract a character string that corresponds to a predetermined time period from the text data as features;

compare the features of each of the information processing devices with one another;

select, among the information processing devices, first information processing devices that acquire the voice data from a single participant based on the features and group the first information processing devices together;

assign, for a group of the first information processing devices, a work space that can be accessed by the first information processing devices; and notify the first information processing devices of information related to the work space that allows the first information processing devices to access the work space assigned to the first information processing devices.

20. A non-transitory recording medium storing a computer readable program causing a computer to:

extract a wavelength of illumination light or a change in illuminance in a first area in which a conference is held during a predetermined time period as features, wherein the wavelength of the illumination light or the change in the illuminance is obtained by information processing devices used by participants of the conference;

compares the features of each of the information processing devices with one another;

selects, among the information processing devices, first information processing devices that acquire voice data from a single participant based on the features and group the first information processing devices together;

assigns, for a group of the first information processing devices, a work space that can be accessed by the first information processing devices; and notifies the first information processing devices of information related to the work space that allows the first information processing devices to access the work space assigned to the first information processing devices.

* * * * *